United States Patent
Sooch et al.

(10) Patent No.: US 7,324,496 B1
(45) Date of Patent: Jan. 29, 2008

(54) HIGHLY INTEGRATED RADIO-FREQUENCY APPARATUS AND ASSOCIATED METHODS

(75) Inventors: Navdeep S. Sooch, Austin, TX (US); G. Tyson Tuttle, Austin, TX (US)

(73) Assignee: NXP B.V., Eindhoven (NL)

( * ) Notice: Subject to any disclaimer, the term of this patent is extended or adjusted under 35 U.S.C. 154(b) by 970 days.

(21) Appl. No.: 10/426,042

(22) Filed: Apr. 29, 2003

Related U.S. Application Data

(60) Provisional application No. 60/447,659, filed on Feb. 14, 2003, provisional application No. 60/400,269, filed on Jul. 31, 2002, provisional application No. 60/376,927, filed on May 1, 2002.

(51) Int. Cl.
*H04J 3/00* (2006.01)

(52) U.S. Cl. ..................................... 370/345

(58) Field of Classification Search ...................... None
See application file for complete search history.

(56) References Cited

U.S. PATENT DOCUMENTS

| | | | |
|---|---|---|---|
| 4,384,361 A | 5/1983 | Masaki | |
| 4,805,165 A | 2/1989 | Kawamura et al. | |
| 4,870,699 A | 9/1989 | Garner et al. | |
| 4,879,758 A | 11/1989 | DeLuca et al. | |
| 4,930,126 A | 5/1990 | Kazecki et al. | |
| 4,996,639 A | 2/1991 | Ishimoto et al. | |
| 5,031,233 A | 7/1991 | Ragan | |
| 5,058,203 A | 10/1991 | Inagami | |
| 5,142,699 A | 8/1992 | Sato et al. | |
| 5,150,361 A | 9/1992 | Wieczorek et al. | |
| 5,151,769 A | 9/1992 | Immorlica, Jr. et al. | |
| 5,241,541 A | 8/1993 | Farrell et al. | |
| 5,280,644 A | 1/1994 | Vannatta et al. | |
| 5,307,066 A | 4/1994 | Kobayashi et al. | |
| 5,355,524 A | 10/1994 | Higgins, Jr. | |
| 5,448,755 A | 9/1995 | Tanaka | |
| 5,471,471 A | 11/1995 | Freeburg et al. | |
| 5,471,663 A | 11/1995 | Davis | |
| 5,475,684 A | 12/1995 | Shimizu | |
| 5,519,711 A | 5/1996 | Sointula | |
| 5,604,928 A | 2/1997 | Hamano et al. | |
| 5,630,224 A * | 5/1997 | Swail | 455/296 |
| 5,649,160 A | 7/1997 | Corry et al. | |
| 5,758,278 A | 5/1998 | Lansdowne | |
| 5,764,693 A | 6/1998 | Taylor et al. | |
| 5,812,936 A | 9/1998 | DeMont | |
| 5,838,741 A | 11/1998 | Callaway, Jr. et al. | |
| 5,842,037 A * | 11/1998 | Haartsen | 710/1 |
| 5,859,878 A * | 1/1999 | Phillips et al. | 375/316 |
| 5,872,540 A | 2/1999 | Casabona et al. | |
| 5,875,449 A | 2/1999 | Ono | |
| 5,917,854 A | 6/1999 | Taylor et al. | |
| 5,920,592 A | 7/1999 | Tanaka et al. | |
| 5,923,761 A | 7/1999 | Lodenius | |

(Continued)

*Primary Examiner*—Frank Duong
(74) *Attorney, Agent, or Firm*—Peter Zawilski

(57) ABSTRACT

A method of operating a radio-frequency (RF) circuitry and a signal-processing circuitry in a mobile telephone apparatus includes operating the RF circuitry during a first time period. During the first period, the RF circuitry generates a set of data from an RF signal received by the mobile telephone apparatus. The method further includes storing the set of data in a storage device. The method also includes operating the signal-processing circuitry during a second time period to process the set of data.

7 Claims, 21 Drawing Sheets

U.S. PATENT DOCUMENTS

| | | |
|---|---|---|
| 5,953,640 A | 9/1999 | Meador et al. |
| 6,020,614 A | 2/2000 | Worley |
| 6,243,597 B1 | 6/2001 | Daanen |
| 6,246,335 B1 | 6/2001 | Tsunoda |
| 6,341,145 B1 * | 1/2002 | Hioe et al. ................. 375/256 |
| 6,366,622 B1 | 4/2002 | Brown et al. |
| 6,480,553 B1 | 11/2002 | Ho et al. |
| 6,498,819 B1 | 12/2002 | Martin |
| 6,510,185 B2 | 1/2003 | Lee et al. |
| 2002/0080728 A1 | 6/2002 | Sugar et al. |
| 2003/0020521 A1 | 1/2003 | Lee et al. |

* cited by examiner

HIGHLY INTEGRATED RADIO-FREQUENCY APPARATUS AND ASSOCIATED METHODS

CROSS-REFERENCE TO RELATED APPLICATIONS

This patent application claims priority to, and incorporates by reference, provisional U.S. Patent Application Ser. No. 60/376,927, filed on May 1, 2002; provisional U.S. Patent Application Ser. No. 60/400,269, filed on Jul. 31, 2002; and provisional U.S. Patent Application Ser. No. 60/447,659, filed on Feb. 14, 2003.

Furthermore, the present patent application incorporates by reference the following patent documents, which relate to various apparatus, circuitry, architectures, techniques, and methods relating to communication circuitry:

U.S. Provisional Patent Application Ser. No. 60/364,986, titled "Partitioned Radio-Frequency Apparatus and Associated Methods";

U.S. patent application Ser. No. 09/686,072, titled "Method and Apparatus for Reducing Interference";

U.S. patent application Ser. No. 10/075,122, titled "Digital Architecture for Radio-Frequency Apparatus and Associated Methods";

U.S. patent application Ser. No. 10/075,099, titled "Notch Filter for DC Offset Reduction in Radio-Frequency Apparatus and Associated Methods";

U.S. patent application Ser. No. 10/074,676, titled "DC Offset Reduction in Radio-Frequency Apparatus and Associated Methods";

U.S. patent application Ser. No. 10/075,094, titled "Radio-Frequency Communication Apparatus and Associated Methods";

U.S. patent application Ser. No. 10/075,098, titled "Apparatus and Methods for Generating Radio Frequencies in Communication Circuitry";

U.S. patent application Ser. No. 10/074,591, titled "Apparatus for Generating Multiple Radio Frequencies in Communication Circuitry and Associated Methods";

U.S. patent application Ser. No. 10/079,058, titled "Apparatus and Methods for Output Buffer Circuitry with Constant Output Power in Radio-Frequency Circuitry";

U.S. patent application Ser. No. 10/081,730, titled "Method and Apparatus for Synthesizing High-Frequency Signals for Wireless Communications";

U.S. patent application Ser. No. 10/079,057, titled "Apparatus and Method for Front-End Circuitry in Radio-Frequency Apparatus";

U.S. patent application Ser. No. 10/081,121, titled "Calibrated Low-Noise Current and Voltage References and Associated Methods"; and U.S. patent application Ser. No. 10/083,633, titled "Apparatus and Methods for Calibrating Signal-Processing Circuitry."

TECHNICAL FIELD

This patent document relates generally to radio-frequency (RF) apparatus and, more particularly, to highly integrated RF apparatus.

BACKGROUND

In a typical high-performance RF receiver, transmitter, or transceiver, the RF front-end circuitry generally resides in a different circuit partition (e.g., integrated circuit (IC), die, etc.) than does the signal-processing circuitry (e.g., baseband). U.S. patent application Ser. No. 10/075,122, referenced above, for example, discloses partitioning techniques for including the RF front-end circuitry in a different circuit partition than the signal-processing digital circuitry.

RF circuitry, such as the RF front-end circuitry, typically includes analog circuitry that has a relatively high sensitivity to noise and interference. Furthermore, the RF circuitry in some applications, for example, in a mobile communication cellular handset, may have to detect signals as small as a few micro-volts in amplitude. A typical RF front-end circuitry includes one or more low-noise amplifiers (LNAs) designed to amplify small RF signals received at an antenna. The performance of the LNAs and, hence, the overall communication apparatus, may suffer as a result of noise and interference from sources external or even internal to the communication apparatus.

In a typical communication apparatus, such as a mobile communication handset, the digital circuitry in the signal-processing circuitry produces digital signals with relatively small rise and fall times, or with fast transitions or sharp edges. Furthermore, those signals often have relatively high frequencies. As a result, their Fourier series or transforms have rich harmonic contents. The harmonics, or higher-frequency Fourier series components, interfere with, and adversely impact the performance of, the RF front-end circuitry. For further discussion of such interference issues, see U.S. patent application Ser. No. 10/075,122, titled "Digital Architecture for Radio-Frequency Apparatus and Associated Methods," referenced above. One solution constitutes using more than one circuit partition. For example, one partition may include the RF front-end circuitry, while a second partition includes the signal-processing circuitry.

Using more than one partition for the RF front-end circuitry and the signal-processing circuitry, however, has several disadvantages, such as increased component count, size, and overall cost, and more potential for decreased reliability and increased manufacturing failures. A need exists for highly integrated RF apparatus that include a complete radio in one partition, die, IC, etc.

SUMMARY

This invention contemplates highly integrated time-domain isolated RF apparatus and associated methods. One aspect of the invention relates to methods of operating an RF apparatus, such as a mobile telephone apparatus.

In one embodiment, a method according to the invention for operating an RF circuitry and a signal-processing circuitry in a mobile telephone apparatus includes operating the RF circuitry during a first time period to generate a set of data from an RF signal received by the mobile telephone apparatus. The method also includes storing the set of data in a storage device. The method further includes operating the signal-processing circuitry during a second time period to process the set of data.

In another embodiment, a method according to the invention for operating an RF circuitry and a signal-processing circuitry in a mobile telephone apparatus includes operating the signal-processing circuitry during a first time period to generate a set of data. The method further includes storing the set of data in a storage device. The method also includes operating the RF circuitry in a second time period to generate RF signals from the set of data, and to transmit the RF signals as output signals of the mobile telephone apparatus.

DESCRIPTION OF THE DRAWINGS

The appended drawings illustrate only exemplary embodiments of the invention and therefore should not be considered as limiting its scope. The disclosed inventive concepts lend themselves to other equally effective embodiments. In the drawings, the same numeral designators used in more than one drawing denote the same, similar, or equivalent functionality, components, or blocks.

FIG. 5 depicts a communication apparatus according to a third illustrative embodiment of the invention with a circuit partition that includes RF front-end circuitry and signal-processing circuitry.

DETAILED DESCRIPTION

This invention contemplates highly integrated time-domain isolated RF apparatus. The inventive concepts described here obviate the need for partitioning the RF circuitry and the signal-processing circuitry. Put another way, in communication systems according to exemplary embodiments of the invention, the RF circuitry, including the RF front-end circuitry and the signal-processing circuitry (e.g., digital signal processor (DSP), microprocessor, microcontroller, general-purpose logic circuitry, and the like) may reside in the same circuit partition.

The circuit partition may constitute a variety of substrates, carriers, or packaging arrangements, as persons of ordinary skill in the art who have the benefit of the description of the invention understand. By way of illustration, the circuit partition may comprise an IC, a semiconductor die, thin-film substrate, thick-film substrate, an isolated partition on a single substrate, a circuit-board partition, a module, a multi-chip module (MCM), and the like, as desired.

Because of the time-domain isolation nature of the system or apparatus, the RF front-end circuitry operates when the signal-processing circuitry is inactive, and vice-versa. (Note, however, that the operation of the RF front-end circuitry and the signal-processing circuitry may overlap by some amount, as described below.) As a consequence, the digital switching noise and associated harmonic content do not interfere with the performance of the RF circuitry, and vice-versa. To provide for the inclusion of the RF front-end circuitry and the signal-processing circuitry within the same circuit partition (e.g., IC or die), illustrative embodiments according to the invention employ one or more storage devices, as described in detail below.

Figure 1:
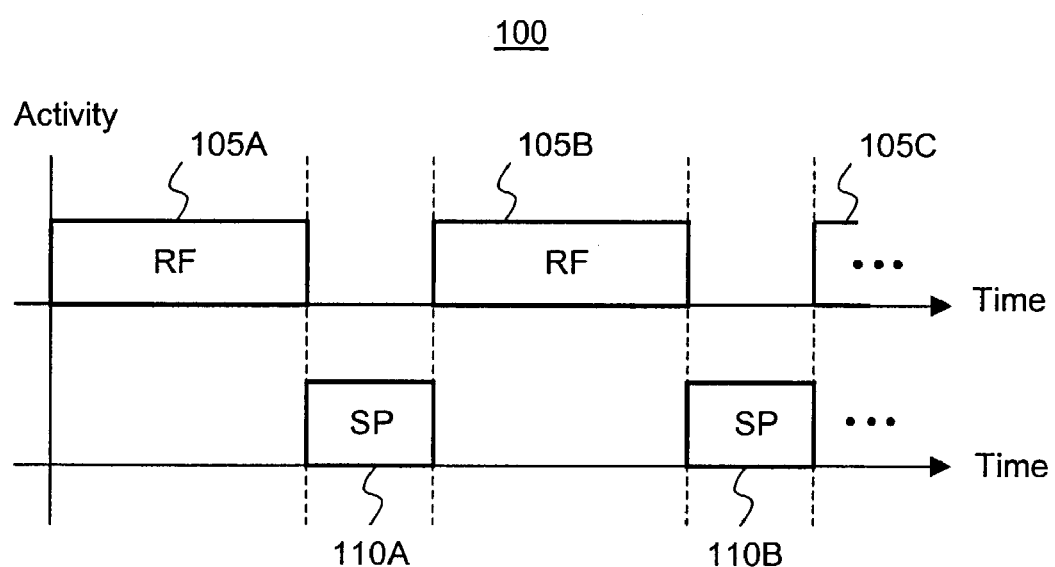
FIG. 1 shows a set of events that occur in a general communication system according to the invention.

FIG. 1 illustrates a set of events that occur in a general communication system with time-domain isolation according to the invention. Broadly speaking, two alternate events take place in such a system: RF reception or transmission, and signal processing. Put another way, the system arranges in time the RF reception or transmission activities and the signal-processing activities so as to avoid or reduce interference between the RF front-end circuitry and the signal-processing circuitry.

Referring to FIG. 1, communication systems or apparatus with time-domain isolation according to exemplary embodiments of the invention use a plurality of RF time-slots 105A, 105B, 105C, and so on. Such systems or apparatus also employ a plurality of signal-processing time-slots 110A, 110B, and so on. During RF time-slots 105A-105C, the system or apparatus (e.g., the RF front-end in the system or apparatus) may receive RF signals (from a transmitter or transceiver) or transmit RF signals (to a receiver or transceiver), process the received signals, and store the results in one or more storage devices (as described in detail below). Subsequently, during signal-processing time-slots 110A-110B, the system or apparatus (e.g., the signal-processing circuitry in the system or apparatus) may perform signal-processing tasks on the stored results.

Alternatively, during RF time-slots 105A-105C, the system or apparatus may transmit RF signals (to a receiver or transceiver). In this mode of operation, during signal-processing 110A-110B, the system or apparatus (e.g., the signal-processing circuitry in the system or apparatus) performs signal-processing tasks on input data (e.g., voice, data), and store the results in one or more storage devices (as described in detail below). Subsequently, during RF time-slots 105A-105C, the system or apparatus (e.g., the RF front-end of the apparatus or system) may process transmit signals and perform RF operations (for example, up-conversion) on the stored results and transmit an RF signal.

Note that the signal-processing tasks performed during signal-processing time-slots 110A-110B constitute the core signal-processing functions in an RF communication apparatus. Examples of such tasks include modulation, demodulation, coding, decoding, and the like.

Figure 21:
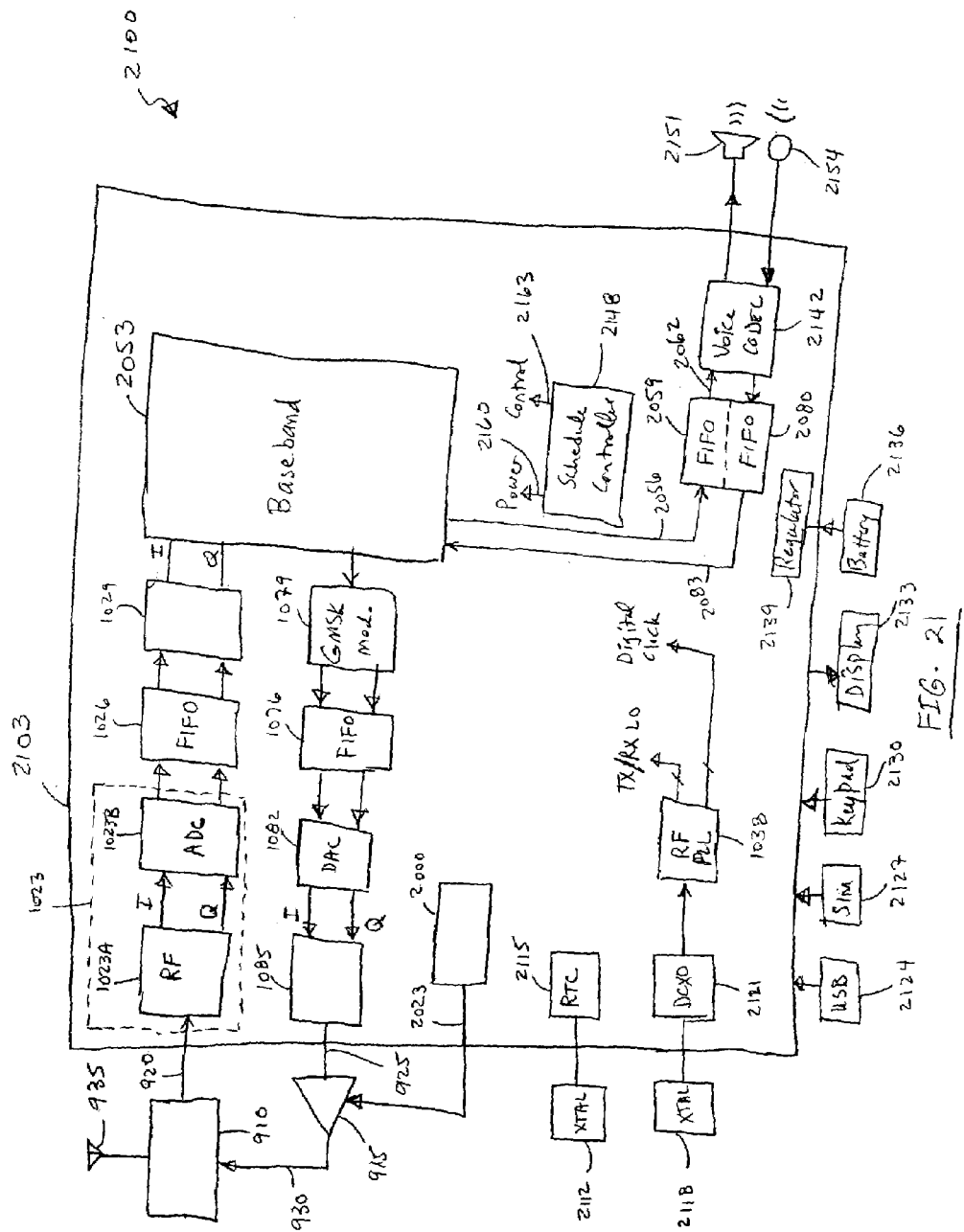
FIG. 21 depicts a more detailed block diagram of an exemplary embodiment of a mobile telephone according to the invention.

Exemplary embodiments according to the invention, such as the embodiments in FIGS. 2-10, may include other circuitry (not shown explicitly in FIGS. 2-10), such as peripheral circuitry, interface circuitry, and input/output (I/O) circuitry. Such circuitry may couple to both the RF front-end circuitry and the signal-processing circuitry, as persons skilled in the art with the benefit of the description of the invention understand. Examples include voice coder-decoders (CODECs), real-time clocks (RTC), display drivers and interface circuitry, keypad decoders and interface circuitry, and the like. Such circuitry performs interfacing tasks, housekeeping operations, and input-output processing to complement the core signal-processing tasks that the signal-processing circuitry performs. FIG. 21 shows an illustrative embodiment according to the invention that includes some of the peripheral circuitry, interface circuitry, and input/output (I/O) circuitry in a telephone. Persons skilled in the art with the benefit of the description of the invention understand, however, that one may include such circuitry in a variety of embodiments according to the invention.

Depending on the specific protocol, architecture, and circuitry used, the system or apparatus may receive and transmit simultaneously, as desired. More commonly, however, the system either transmits signals or receives signals during any of RF time-slots 105A-105C, or in bursts. For example, a GSM-compliant system or apparatus, such as a mobile telephone that complies with the GSM specifications, either receives or transmits RF signals in one or more bursts of activity during RF time-slots 105A-105C.

Note that RF time-slots 105A-105C may have the same or different durations, as desired. Generally, RF time-slots 105A-105C may have unequal lengths so as to accommodate a wide variety of circuitry, systems, protocols, and specifications, as desired. Each of RF time-slots 105A-105C may include several other time-slots or a frame, depending on the particular communication protocol or technique used. For example, in a GSM application, each RF time-slot may include a frame that in turn includes slots for various activities, such as RF reception, RF transmission, monitoring, idle slots, and the like, as described above.

Similarly, signal-processing time-slots 110A-110B may have similar or dissimilar durations, as desired. Generally speaking, the signal-processing time-slots may have unequal lengths so as to accommodate a broad array of signal-processing apparatus, circuitry, algorithms, and processing techniques. Each of signal-processing time-slots 110A-110B may include several other time-slots or time divisions, depending on the particular communication protocol and/or signal-processing techniques and the particular circuitry and technology used. For example, a signal-processing time-slot may include several time-slots, with a portion or a particular circuitry active or processing signals during one or more of the time-slots.

Furthermore, one may perform the signal-processing tasks in a serial or multiplexed manner (e.g., by sharing hardware to perform a variety of tasks), in a parallel manner (e.g., by using dedicated hardware for each signal-processing task), or a combination of the two techniques, as desired. The choice of signal-processing hardware, firmware, and software depends on the design and performance specifications for a given desired implementation, as persons of ordinary skill in the art who have the benefit of the description of the invention understand.

To implement a communication system or apparatus with time-domain isolation according to the invention, one may activate and deactivate the RF circuitry and the signal-processing circuitry in a variety of ways, as persons of ordinary skill in the art who have the benefit of the description of the invention understand. For example, before a signal-processing time-slot commences, one may inactivate the RF front-end circuitry by powering it down, disabling, or inhibiting its operation or its circuitry. When the signal-processing time-slot ends, one may power up (and settle and calibrate, as appropriate) the RF front-end circuitry to receive and/or transmit, as desired.

As another example, one may inactivate the signal-processing circuitry (e.g., before an RF time-slot commences) by disabling or inhibiting the clock signal or signals within the signal-processing circuitry. More specifically, by using static metal oxide semiconductor (MOS) circuitry, one may shut down the clock signal or signals within the signal-processing circuitry without losing the data present within that circuitry. Accordingly, the signal-processing circuitry can preserve the data within it while the RF front-end circuitry operates. Once the RF front-end circuitry has deactivated (e.g., an RF time-slot has ended), one may activate the signal-processing circuitry by asserting the clock signal or signals in order to commence or continue the processing of the data.

Note that exemplary embodiments according to the invention may use dynamic circuitry, as desired. For example, they may include one or more dynamic memories used as a storage device, buffer, and the like. Depending on various factors (e.g., communication protocol, specific circuitry, noise levels and tolerance, and system and component design and performance specifications) within the knowledge of persons skilled in the art with the benefit of the description of the invention, one may use, activate, or refresh the dynamic circuitry during RF time-slots 105A-105C and/or signal-processing time-slots 110A-110B. For example, one may refresh a dynamic memory, such as a dynamic random-access memory (DRAM) during an RF time-slot 105A-105C by using techniques to reduce interference and noise, such as the techniques described below.

Furthermore, as noted above, communication apparatus according to the invention may include other circuitry (not shown explicitly in FIGS. 2-10), such as peripheral circuitry, interface circuitry, and input/output (I/O) circuitry that may couple to the RF front-end circuitry and/or the signal-processing circuitry. (Examples include voice CODECs, real-time clocks, display drivers and interface circuitry, keypad decoders and interface circuitry, Universal Serial Bus (USB) circuitry, serial port or interface circuitry, universal asynchronous receiver/transmitter (UART) circuitry, and the like.) Such circuitry may operate during one or more of RF time-slots 105A-105C and/or one or more of signal-processing time-slots 110A-110B. To allow for operation of such circuitry during RF time-slots 105A-105C, one may use noise and interference management and mitigation techniques, such as the techniques described below, as desired.

Although FIG. 1 depicts the operation of the RF front-end circuitry and the signal-processing circuitry as alternative events, note that the operations of the two need not be mutually exclusive. Generally, one may seek to reduce or minimize the amount of overlap between the operation of the RF circuitry and the signal-processing circuitry. Depending on a number of factors, however, the operation of the RF circuitry may overlap with the operation of the signal-processing circuitry to a desired extent. Generally, depending on the factors, such as those described below, one may overlap the operations of the RF front-end circuitry and the signal-processing circuitry by an amount that does not cause detrimental interference between the two system blocks. Put another way, one may overlap the operations of the two blocks by an effective amount that provides more system flexibility without causing erroneous or undesired results or failure in the operation of the RF front-end circuitry and the signal-processing circuitry as a result of interference.

Note that one may partially power down (turn OFF), disable, or inhibit the operations of the signal-processing circuitry during the operation of the RF front-end circuitry. In other words, some of the circuitry, components, and/or blocks within the signal-processing circuitry may operate while the RF front-end circuitry operates. One may turn off, disable, or inhibit as much of the signal-processing circuitry as practical or desired in order to reduce interference to an acceptable or desired level (for example, as specified by standards or product specifications).

The amount and the extent of the overlap depends on such factors as the degree of susceptibility of the RF circuitry to digital switching noise, the level of noise generated, the communication protocol and specifications, the nature of the circuitry and apparatus used, the speed of operation of the signal-processing circuitry, and the like, as persons skilled in the art with the benefit of the description of the invention understand. As one example, the signal-processing circuitry may operate at the same time that the RF circuitry powers up, settles, and/or calibrates in preparation for a period of RF activity (e.g., a burst of reception or transmission).

Furthermore, one may use interference management and mitigation techniques and circuitry to provide overlapping operation of the RF front-end circuitry and the signal-processing circuitry (as well as the peripheral circuitry, interface circuitry, and I/O circuitry, noted above), as desired. By way of illustration, examples of such techniques and circuitry include some of the following:

filtering the digital signals within the system so as to slow down the edges (or rise and fall times), thus reducing the harmonic content of those signals in the RF ranges;

using differential signaling, which communicates each digital signal over a differential pair of lines or coupling mechanisms. Additionally, one may route the differential signal lines physically close to each other, thus reducing the loop area of the digital signal lines; and using a current-mode signaling technique that converts the digital signals (or other signals that may cause interference) to current signals and maintains the voltage levels of those signals at relatively constant levels. This technique helps to limit the voltage excursions of the digital signals and reduce the undesired coupling.

U.S. patent application Ser. No. 09/686,072, titled "Method and Apparatus for Reducing Interference," filed on Oct. 11, 2000, referenced above, describes various interference reduction and management techniques in RF apparatus and systems. One may apply those techniques, the techniques described above, or both, or a subset of those techniques in communication systems according to the invention, as desired. Furthermore, U.S. patent application Ser. No. 10/075,122, titled "Digital Architecture for Radio-Frequency Apparatus and Associated Methods," referenced above, describes an example of a current-mode interface that one may use to reduce interference.

Figure 2:
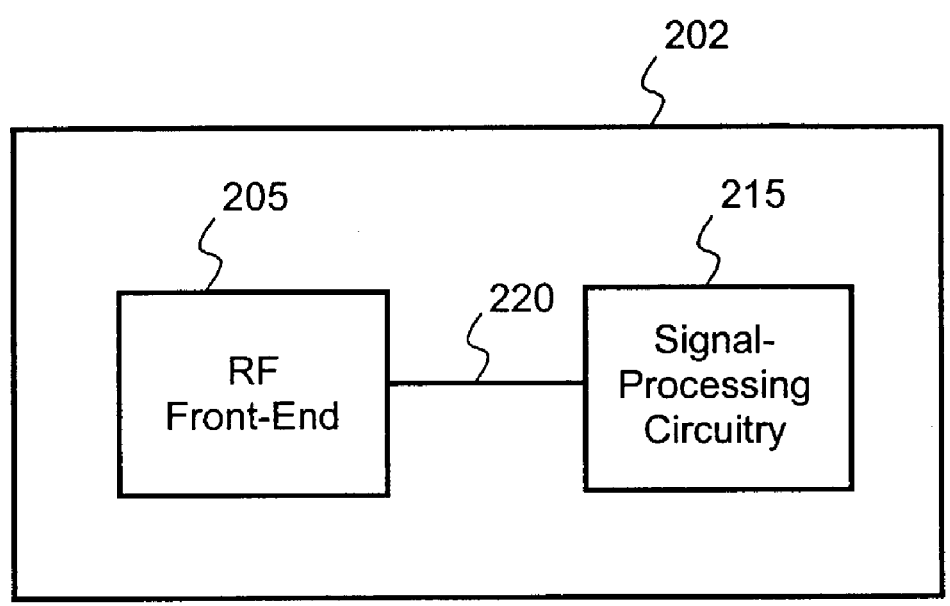
FIG. 2 illustrates a general embodiment according to the invention of a communication apparatus.

The inventive concepts lend themselves to manifestation and implementations in a wide variety of architectures and embodiments. FIG. 2 shows a general embodiment according to the invention of a communication apparatus 200. Communication apparatus 200 includes a circuit partition, 202 for example, an IC or semiconductor die. Circuit partition 202 comprises RF front-end circuitry 205 and signal-processing circuitry 215.

RF front-end circuitry 205 and signal-processing circuitry 215 couple to each other through signal link 220. Signal link 220 may include various signals, for example, processed RF signals, control and status signals, and the like, as persons skilled in the art with the benefit of the description of the invention understand. Note that signal link 220 may comprise a number of interconnect lines or traces on a semiconductor die, and does not necessarily denote a group of signal lines, such as a bus (although it may take the form of a bus, as desired). As noted above, communication apparatus 200 also includes one or more storage devices (not shown explicitly in FIG. 2), as described below in detail.

Note that RF front-end circuitry 205 may receive and/or provide various signals (such as input or output RF signals for RF receiver and transmitter functionality, respectively) not shown explicitly in some of the drawings. Furthermore, signal-processing circuitry 215 may supply or receive various signals (for example, input speech or data signals, output speech or data signals, etc.) not shown explicitly in some of the drawings. The choice of the type, number, and configuration of the signals that RF front-end circuitry 205 and signal-processing circuitry 215 receive or supply falls within the knowledge of persons of ordinary skill in the art who have the benefit of the description of the invention.

RF front-end circuitry 205 may provide reception functionality, transmission functionality, or both (i.e., transceiver functionality). Thus, RF front-end circuitry 205 may include receiver circuitry to provide RF reception capability. Instead or in addition to receiver circuitry, RF front-end circuitry 205 may comprise transmitter circuitry adapted to provide RF transmission capability. RF front-end circuitry 205 may include both receiver circuitry and transmitter circuitry (either as distinct circuit blocks or combined circuitry), as desired. In such a configuration, RF front-end circuitry 205 can provide RF transceiver capability.

Signal-processing circuitry 215 may provide a variety of signal-processing functions, as desired. For example, signal-processing circuitry 215 may perform filtering, decimation, modulation, demodulation, coding, decoding, correlation, general digital signal-processing (DSP) functions, and signal scaling. In addition, one may include other signal-processing functionality within signal-processing circuitry 215, as desired. Signal-processing circuitry 215 may include DSP circuitry, microcontroller circuitry, and the like, as desired, and depending on a particular application. The choice of the type, configuration, and number of signal-processing blocks or functionality in signal-processing circuitry 215 depends on performance and design specifications and requirements for a given implementation, as persons of ordinary skill in the art who have the benefit of the description of the invention appreciate.

Communication apparatus according to the invention, such as apparatus 200 in FIG. 2, also include one or more storage devices. The storage devices store data and/or information at one or more locations in the communication apparatus. Furthermore, the storage devices may constitute analog or digital storage devices. Examples of storage devices include buffers, general memory circuitry, register files (including shift registers), first-in, first-out (FIFO) buffers, last-in, first out (LIFO) buffers, random-access memory (RAM), static RAM (SRAM), ferroelectric memory, magnetic memory, sample-and-hold circuitry, hard disk drives, optical storage elements, and the like.

Although the drawings show each storage device as a block, one may implement the storage devices as blocks of storage or granular storage, or both, as desired. Furthermore, one may divide each storage device into analog and digital components, as desired. The type, location, architecture, number, and characteristics of the storage device or devices depend on desired performance and design specifications and requirements for a given implementation, as persons of ordinary skill in the art who have the benefit of the description of the invention understand.

The storing of the data and/or information in the storage devices allows communication apparatus according to exemplary embodiments of the invention to operate in a time-domain isolated manner. In other words, one or more storage devices store data and/or information in one or more locations in the communication apparatus in order to allow further processing of the data and/or information by RF front-end circuitry 205 and/or signal-processing circuitry 215 during one or more of RF time-slots 105A-105C or signal-processing time-slots 110A-110B, respectively (or during any overlapping periods between the operation of RF front-end circuitry 205 and signal-processing circuitry 215).

For example, in one illustrative embodiment of an RF receiver according to the invention, RF front-end circuitry 205 may process incoming RF signals (e.g., by amplifying and mixing those signals) in one of RF time-slots 105A-105C and store the resulting signals in a storage device. Subsequently, during one of signal-processing time-slots 110A-110B, signal-processing circuitry 215 may further process the stored signals (e.g., to filter and demodulate the stored signals to generate information or intelligence signals).

As another example, in an exemplary embodiment of an RF transmitter according to the invention, signal-processing circuitry 215 may process input information or intelligence signals (such as speech or data signals) during one of signal-processing time-slots 110A-110B and store the resulting processed signals in a storage device. During one of RF time-slots 105A-105C, RF front-end circuitry 205 may additionally process the stored signals (e.g., to modulate an RF signal) to generate output RF signals.

Figure 3:
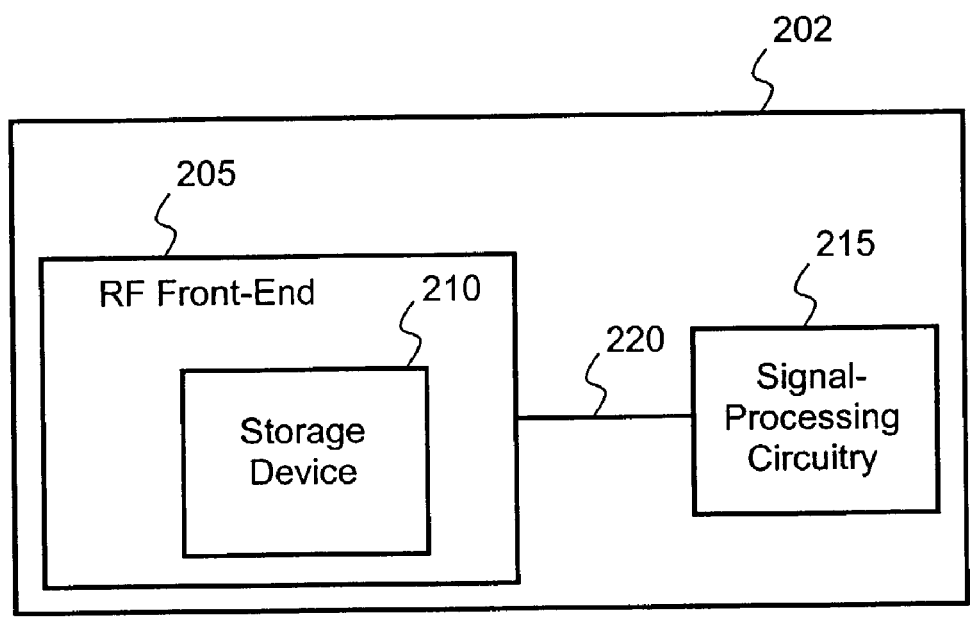
FIG. 3 depicts a communication apparatus in a first exemplary embodiment according to the invention with a circuit partition that includes RF front-end circuitry and signal-processing circuitry.

As noted above, one or more storage devices may reside within one or more locations within communication apparatus according to the invention. FIG. 3 illustrates a communication apparatus 250 in an exemplary embodiment according to the invention. Communication apparatus 250 includes circuit partition 202. Like apparatus 200 described above, communication apparatus 250 also includes RF front-end circuitry 205 coupled to signal-processing circuitry 215 via signal link 220. FIG. 3, however, explicitly shows the location of storage device 210. In apparatus 250, storage device 210 resides within RF front-end circuitry 205.

Figure 4:
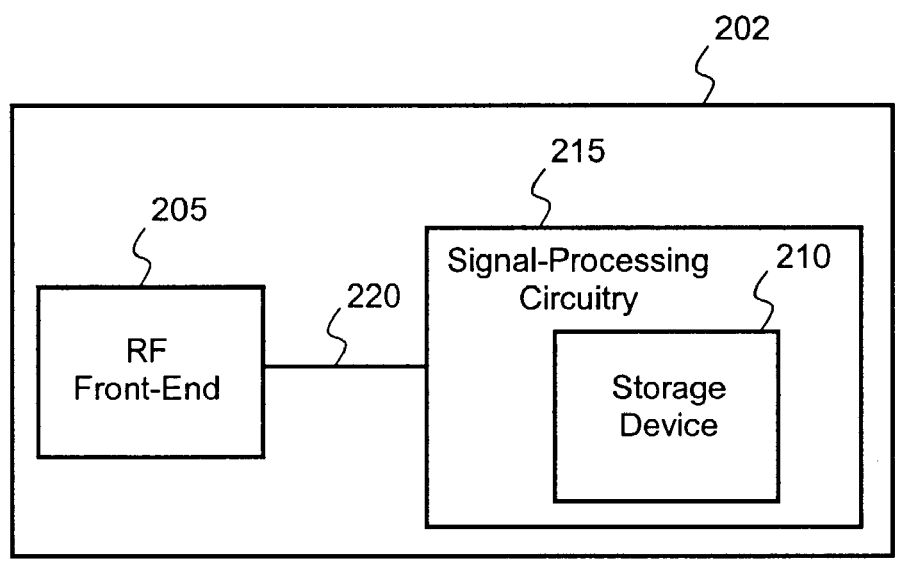
FIG. 4 shows a communication apparatus according to a second illustrative embodiment of the invention with a circuit partition that includes RF front-end circuitry and signal-processing circuitry.

FIG. 4 shows a communication apparatus 300 according to another illustrative embodiment of the invention. Communication apparatus 300 comprises circuit partition 202. Similar to apparatus 250 (see FIG. 3), communication apparatus 202 includes RF front-end circuitry 205 and signal-processing circuitry 215. RF front-end circuitry 205 and signal-processing circuitry 215 couple to each other via signal link 220. Unlike apparatus 250 (see FIG. 3), in apparatus 300, storage device 210 resides within signal-processing circuitry 215.

Figure 5:
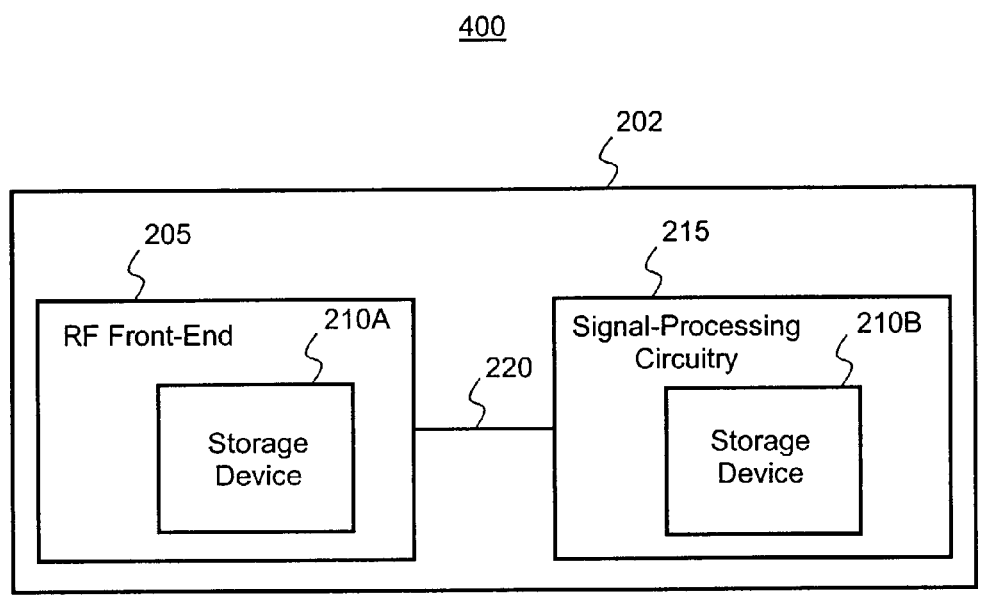
FIG. 5 illustrates

As noted above, one may include more than one storage device in a communication apparatus, as desired. FIG. 5 depicts a communication apparatus 400 according to an illustrative embodiment of the invention. Communication apparatus 400 comprises circuit partition 202. Like apparatus 300 (see FIG. 4), communication apparatus 400 includes RF front-end circuitry 205 and signal-processing circuitry 215, which couple to each other via signal link 220. Communication apparatus 400 also includes storage device 210A and storage device 210B. Storage device 210A resides within RF front-end circuitry 205, whereas storage device 210B resides in signal-processing circuitry 215.

Figure 6:
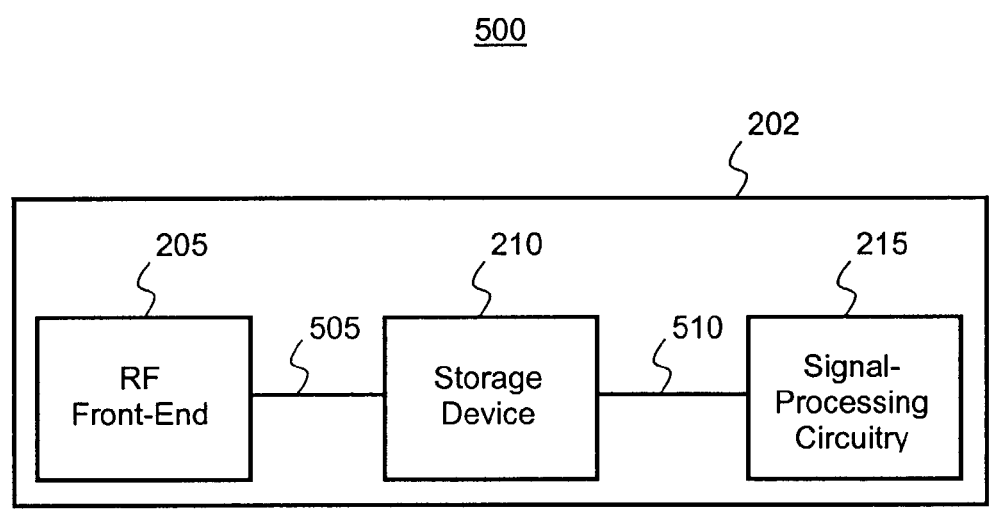
FIG. 6 depicts a communication apparatus according to fourth exemplary embodiment of the invention with a circuit partition that includes RF front-end circuitry and signal-processing circuitry.

FIG. 6 illustrates a communication apparatus 500 according to another exemplary embodiment of the invention. Communication apparatus 500 comprises circuit partition 202. Communication apparatus 500 includes RF front-end circuitry 205, storage device 210, and signal-processing circuitry 215. RF front-end circuitry 205 couples to storage device 210 via signal link 505. Storage device 210 couples to signal-processing circuitry 215 via signal link 510. Signal link 505 and signal link 510 may be similar to signal link 220, described above. Storage device 210 therefore resides in the signal path from RF front-end circuitry 205 to signal-processing circuitry 215.

Figure 7:
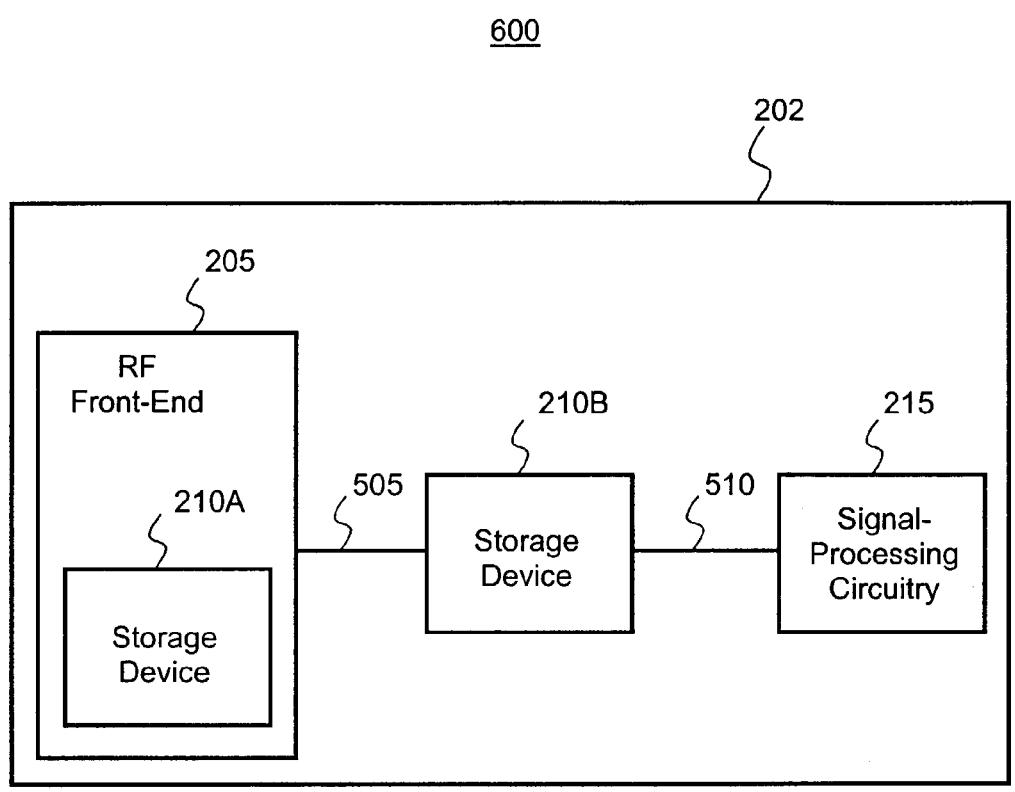
FIG. 7 shows a communication apparatus according to a fifth illustrative embodiment of the invention with a circuit partition that includes RF front-end circuitry and signal-processing circuitry.

FIG. 7 shows a communication apparatus 600 according to another illustrative embodiment of the invention. Communication apparatus 600 includes circuit partition 202. Similar to the embodiments described above, communication apparatus 600 includes RF front-end circuitry 205 and signal-processing circuitry 215. Apparatus 600 also comprises storage device 210A and storage device 210B. RF front-end circuitry 205 and signal-processing circuitry 215 couple to storage device 210B via signal link 505 and signal link 510, respectively. Signal link 505 and signal link 510 may be similar to signal link 220, described above. Like apparatus 250 (see FIG. 3), storage device 210A resides in RF front-end circuitry 205. Storage device 210B, on the other hand, resides in the signal path from RF front-end circuitry 205 to signal-processing circuitry 215, similar to apparatus 500 (see FIG. 6).

Figure 8:
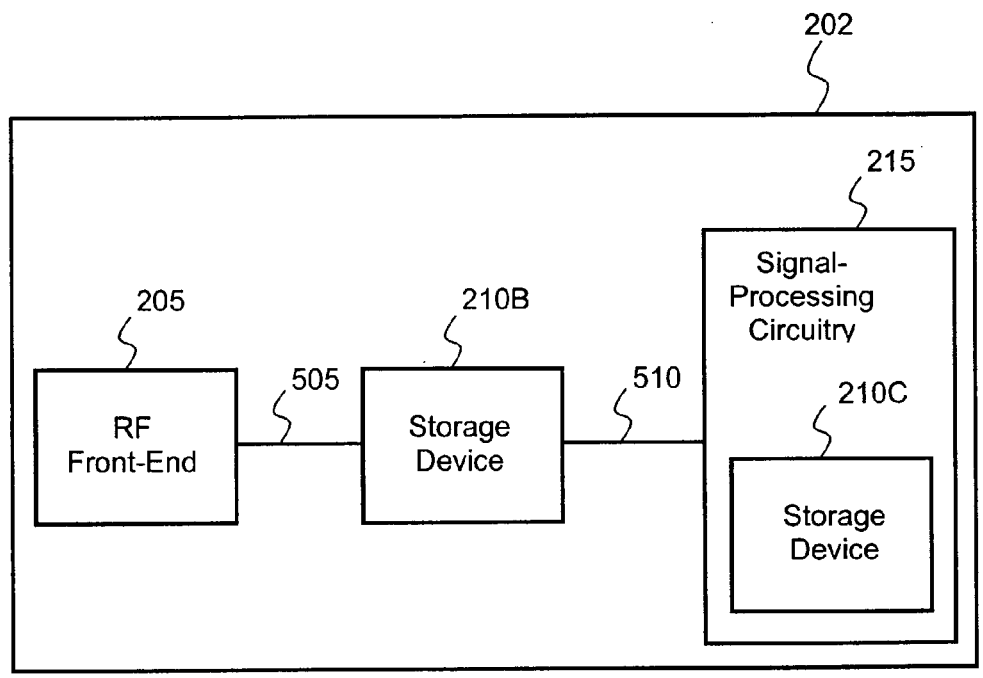
FIG. 8 illustrates a communication apparatus according to a sixth exemplary embodiment of the invention with a circuit partition that includes RF front-end circuitry and signal-processing circuitry.

FIG. 8 depicts a communication apparatus 700 according to another exemplary embodiment of the invention. Communication apparatus 700 comprises circuit partition 202. Like the embodiments described above, communication apparatus 700 includes RF front-end circuitry 205 and signal-processing circuitry 215. Apparatus 700 also comprises storage device 210B and storage device 210C.

RF front-end circuitry 205 and signal-processing circuitry 215 couple to storage device 210B via signal link 505 and signal link 510, respectively. Signal link 505 and signal link 510 may be similar to signal link 220, described above. Thus, like apparatus 500 (see FIG. 6), storage device 210B resides in the signal path from RF front-end circuitry 205 to signal-processing circuitry 215. Storage device 210C resides in signal-processing circuitry 215, similar to apparatus 300 (see FIG. 4).

Figure 9:
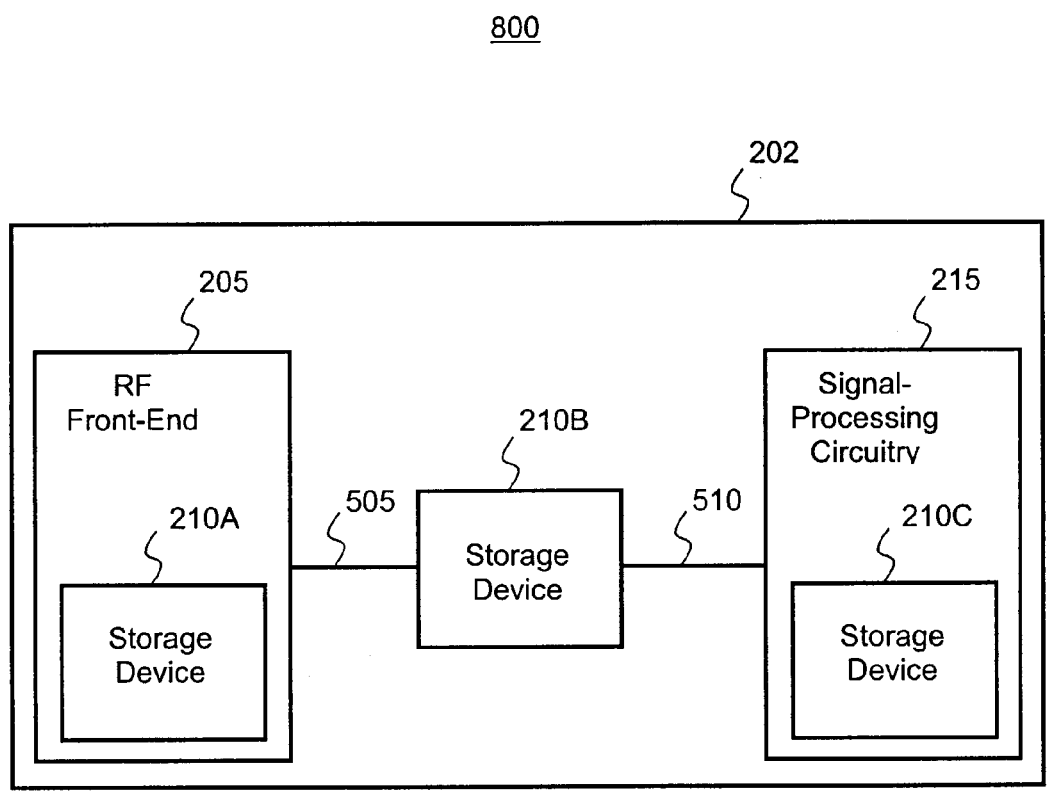
FIG. 9 depicts a communication apparatus according to a seventh illustrative embodiment of the invention with a circuit partition that includes RF front-end circuitry and signal-processing circuitry.

FIG. 9 shows a communication apparatus 800 according to another illustrative embodiment of the invention. Communication apparatus 800 comprises circuit partition 202.

Similar to the embodiments described above, communication apparatus 800 further includes RF front-end circuitry 205 and signal-processing circuitry 215. Apparatus 800 also comprises storage device 210A, storage device 210B, and storage device 210C.

RF front-end circuitry 205 and signal-processing circuitry 215 couple to storage device 210B via signal link 505 and signal link 510, respectively. Signal link 505 and signal link 510 may be similar to signal link 220, described above. Storage device 210B therefore resides in the signal path from RF front-end circuitry 205 to signal-processing circuitry 215. Storage device 210A and storage device 210C, however, reside in RF front-end circuitry 205 and signal-processing circuitry 215, respectively.

As noted above, RF front-end circuitry 205 may provide receiver functionality, transmitter functionality, or both (i.e., transceiver functionality), as desired, by including appropriate circuitry within RF front-end circuitry 205 (and by including appropriate signal-processing functionality in signal-processing circuitry 215). Furthermore, one may provide the receiver functionality, the transmitter functionality, or the transceiver functionality using a variety of architectures, apparatus, circuits, and techniques, as persons skilled in the art with the benefit of the description of the invention understand.

In a receiver according to an exemplary embodiment of the invention, RF front-end circuitry 205 receives the input RF signals and processes them (for example, by amplifying and mixing) and provides processed analog signals to an analog-to-digital converter (ADC). The ADC converts the analog input signals to digital signals. Signal-processing circuitry 215 may operate on the digital signals to perform various signal-processing tasks, such as conversion to baseband, demodulation, decoding, and the like, as desired.

The receiver employs one or more storage devices 210 to store signals at one or more points or locations within the system. For example, one may couple a storage device 210 between the ADC and signal-processing circuitry 215. Storage device 210 may accept and store the digital output signals of the ADC while RF front-end circuitry 205 operates. Alternatively, or in addition, one may include a storage device in the receive-path circuitry before the ADC, or before or after a filter or other signal-processing device, either in the RF front-end circuitry or in the signal-processing circuitry, or both, as desired.

With any configuration of the storage device or device(s), once RF front-end circuitry 205 has finished operation (i.e., the pertinent RF time-slot has ended), a signal-processing time-slot begins (assuming that no overlap exists between RF and signal-processing time-slots). During this time-period, signal-processing circuitry 205 may operate on the data stored in the storage device, as desired.

For illustrative examples of the details of some possible receiver architectures, techniques, and circuitry (irrespective of the different partitioning), see U.S. patent application Ser. No. 10/075,122, titled "Digital Architecture for Radio-Frequency Apparatus and Associated Methods"; U.S. patent application Ser. No. 10/075,099, titled "Notch Filter for DC Offset Reduction in Radio-Frequency Apparatus and Associated Methods"; U.S. patent application Ser. No. 10/074,676, titled "DC Offset Reduction in Radio-Frequency Apparatus and Associated Methods"; U.S. patent application Ser. No. 10/079,057, titled "Apparatus and Method for Front-End Circuitry in Radio-Frequency Apparatus"; U.S. patent application Ser. No. 10/081,121, titled "Calibrated Low-Noise Current and Voltage References and Associated Methods"; and U.S. patent application Ser. No. 10/083,633, titled "Apparatus and Methods for Calibrating Signal-Processing Circuitry," all incorporated by reference in this application.

One may apply similar techniques to transmitters implemented according to exemplary embodiments of the invention. In such a transmitter, signal-processing circuitry 215 receives input signals from a source. The input signals may come from a variety of sources, such as a data source, a microphone and associated CODEC, etc., as persons skilled in the art understand. Signal-processing circuitry 215 may optionally convert the input signals to a digital format, as desired and as appropriate.

Signal-processing circuitry 215 operates on the input data during a signal-processing time-slot and generates suitable signals (e.g., modulated or coded signals) for use by the transmitter circuitry within RF front-end circuitry 205. Signal-processing circuitry 215 or RF front-end circuitry 205 may include a digital-to-analog converter (DAC) to convert the signals to an analog format, as desired, as persons skilled in the art with the benefit of the description of the invention understand.

At the conclusion of the pertinent signal-processing time-slot, an RF time-slot commences (assuming no overlap exists between RF and signal-processing time-slots). During this time period, RF front-end circuitry 205 and, more specifically, RF transmitter circuitry within RF front-end circuitry 205, operates on the output signals received from signal-processing circuitry 215 to generate output RF signals. The RF front-end circuitry may provide the resulting RF signals to a buffer and/or power amplifier, as desired. An antenna propagates the RF signals into a transmission medium.

The transmitter employs one or more a storage devices 210 to store signals at one or more points or locations within the system, as described above. For example, one may include storage devices 210 in RF front-end circuitry 205, in signal-processing circuitry 215, in both RF front-end circuitry 205 and signal-processing circuitry 215, and/or between signal-processing circuitry 215 and RF front-end circuitry 205.

For illustrative examples of the details of possible transmitter architectures, techniques, and circuitry (irrespective of the different partitioning), see U.S. patent application Ser. No. 10/075,094, titled "Radio-Frequency Communication Apparatus and Associated Methods"; U.S. patent application Ser. No. 10/075,098, titled "Apparatus and Methods for Generating Radio Frequencies in Communication Circuitry"; and U.S. patent application Ser. No. 10/074,591, titled "Apparatus for Generating Multiple Radio Frequencies in Communication Circuitry and Associated Methods," all incorporated by reference in this application.

As noted above, one may combine the receive and transmit functions and associated circuitry to provide a transceiver according to the invention, as desired. One may share hardware (such as the signal-processing circuitry) and/or software between the transmit and receive functions. Furthermore, one may use one or more shared storage devices to implement both the receive and transmit functions according to the invention, as desired. The suitability and extent of the sharing of hardware and/or software and system components depends on a variety of factors, such as the communication protocols used, the available hardware, etc., as persons skilled in the art with the benefit of the description of the invention understand.

Figure 10:
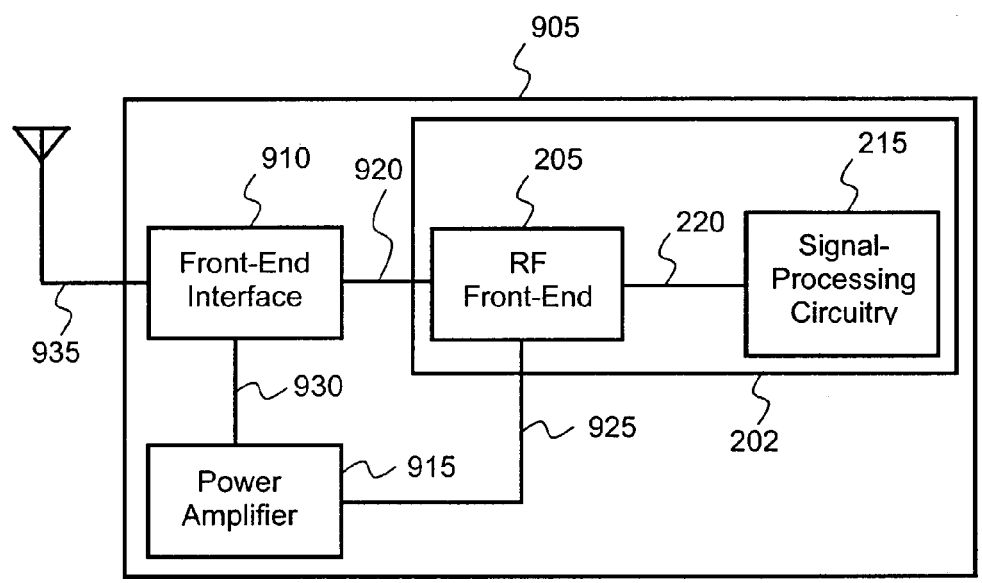
FIG. 10 shows a communication apparatus according to an exemplary embodiment of the invention.

One may include communication apparatus implemented in a single partition according to the invention in a compact module, as desired. FIG. 10 shows a communication apparatus 900 according to an exemplary embodiment of the invention. Apparatus 900 includes module 905, which comprises circuit partition 202, front-end interface 910, antenna 935 and, optionally, power amplifier 915.

Circuit partition 202 includes RF front-end circuitry 205 and signal-processing circuitry 215, coupled together via signal link 220, as described above. RF front-end circuitry 205 may include receiver circuitry, transmitter circuitry, or transceiver circuitry, as desired. Module 905 provides a compact packaging for most of apparatus 900 (with the exception of some components, such as antenna 935, which are typically external to module 905).

Because circuit partition 202 resides within module 905, circuit partition 202 may comprise an unpackaged die, thin-film device, or thick-film device, rather than a packaged IC, as desired. Depending on the application, however, one may include a packaged IC or other configurations of circuit partition 202, as desired, as persons of ordinary skill in the art with the benefit of the description of the invention understand.

Front-end interface 910 couples to RF front-end circuitry 205 via signal link 920. Through signal link 920, front-end interface 910 provides RF input signals to RF front-end circuitry 205 (more specifically, to the receiver circuitry within RF front-end circuitry 205). Put another way, signal link 920 is present in instances where apparatus 900 include receiver or transceiver functionality.

Front-end interface 910 may include a variety of antenna interface circuitry, filtering circuitry, and impedance-matching networks, as desired. The antenna interface circuitry may include a diplexer or antenna switch if apparatus 900 includes both receiver and transmitter functionality. The filtering circuitry may comprise surface acoustic wave (SAW) filters or other filter circuitry for one or more frequency bands of operation, as desired.

The impedance-matching networks may match the output impedance of the antenna interface circuitry or the filtering circuitry to the input impedance of RF front-end circuitry 205 (more specifically, the receiver circuitry within RF front-end circuitry 205). U.S. patent application Ser. No. 10/079,057, titled "Apparatus and Method for Front-End Circuitry in Radio-Frequency Apparatus," and incorporated by reference here, provides more details of the circuitry one may include within front-end interface 910.

If apparatus 900 has transmitter or transceiver functionality, it may also include optional power amplifier 915. Through signal link 925, power amplifier 915 receives RF output signals from the transmitter circuitry within RF front-end circuitry 205. Power amplifier 915 amplifies the RF signals and provides the resulting signals to front-end interface 910 via signal link 930. Note that the transmitter circuitry within the RF front-end circuitry 205 may provide RF signals for one or more frequency bands of transmission, as desired. Depending on the mode of apparatus 900 (i.e., reception versus transmission), the signals communicated to front-end interface 910 may propagate from antenna 935, as desired.

Note that apparatus 900 may include one or more storage devices (not shown explicitly in FIG. 10), in one or more locations, as desired and as described above. Furthermore, note that apparatus 900 may include signal (including power) links to communicate with a variety of devices, as desired. For example, through signal links, apparatus 900 may communicate with a battery, display, keypad, microphone, data source, speaker, or other input or output device, as desired. In addition, apparatus 900 may comprise one or more interfaces for communicating with external devices, controllers, and the like, as desired.

As noted above, during reception in exemplary embodiments according to the invention (e.g., FIGS. 2-10), the system or apparatus (e.g., the RF front-end in the system or apparatus) may receive RF signals during RF time-slots 105A-105C, process or operate on the received signals, and store the results in one or more storage devices 210. Subsequently, during signal-processing time-slots 110A-110B, the system or apparatus (e.g., the signal-processing circuitry in the system or apparatus) may read the stored results and perform signal-processing tasks on those results (or operate on or process those results). Depending on various factors, such as the communication protocol, the type of circuitry used, and system design and performance specifications, storing of the results in one or more storage devices 210 during an RF time-slot 105A-105C may somewhat overlap a preceding or succeeding signal-processing time-slot 110A-110B.

Similarly, during transmission in exemplary embodiments according to the invention (e.g., FIGS. 2-10), the system or apparatus (e.g., the signal-processing circuitry in the system or apparatus) may perform signal-processing tasks (or process or operate) on input signals, for example, voice, data, or intelligence signals, during signal-processing time-slots 110A-110B and store the results in one or more storage devices 210. Subsequently, during RF time-slots 105A-105C, the system or apparatus (e.g., the RF front-end in the system or apparatus) may read the stored results and perform additional operations on (or process) those results to generate an output RF signal. Depending on various factors, such as the communication protocol, the type of circuitry used, and system design and performance specifications, storing of the results in one or more storage devices 210 during a signal-processing time-slot 110A-110B may somewhat overlap a preceding or succeeding RF time-slot 105A-105C.

A typical RF apparatus may include one or more RF synthesizers. The synthesizers generate local-oscillator (LO) signals or other high-frequency signals, as persons skilled in the art understand. In communication systems and apparatus according to the invention, such as the apparatus shown in the accompanying drawings, one may include one or more synthesizers in circuit partition 202, as desired.

More particularly, one may provide the synthesizer or synthesizers in RF front-end circuitry 205, as desired. Inclusion of the synthesizer(s) in RF front-end circuitry 205 may entail using techniques and circuitry to manage interference between the synthesizer circuitry and the other circuitry present in RF front-end circuitry 205, such as sensitive low-noise amplifiers in the receiver circuitry, etc.

One may use interference management apparatus and techniques and apparatus described above and in U.S. Provisional Patent Application Ser. No. 60/364,986, titled "Partitioned Radio-Frequency Apparatus and Associated Methods"; U.S. patent application Ser. No. 10/075,122, titled "Digital Architecture for Radio-Frequency Apparatus and Associated Methods"; and U.S. patent application Ser. No. 09/686,072, titled "Method and Apparatus for Reducing Interference." Furthermore, one may apply the techniques and apparatus described in U.S. patent application Ser. No. 10/079,058, titled "Apparatus and Methods for Output Buffer Circuitry with Constant Output Power in Radio-Frequency Circuitry" and U.S. patent application Ser. No. 10/081,730, titled "Method and Apparatus for Synthesizing High-Frequency Signals for Wireless Communications," and incorporated by reference in this application, as desired.

One may apply the techniques and apparatus according to the invention in a variety of flexible ways and in a multitude of communication systems, as persons of ordinary skill in the art who have the benefit of the description of the invention understand. Generally, one may employ the novel concepts according to the present invention in time-division-multiplexed (TDM) communication systems. Time-division multiple access (TDMA) systems are an example of TDM communication systems. (The GSM system, a TDMA system, constitutes another TDM communication system.)

Furthermore, one may readily configure communication apparatus according to the invention to operate according to a variety of communication protocols, channels, and frequency bands (e.g., GSM, PCS, and DCS), as desired.

Figure 11:
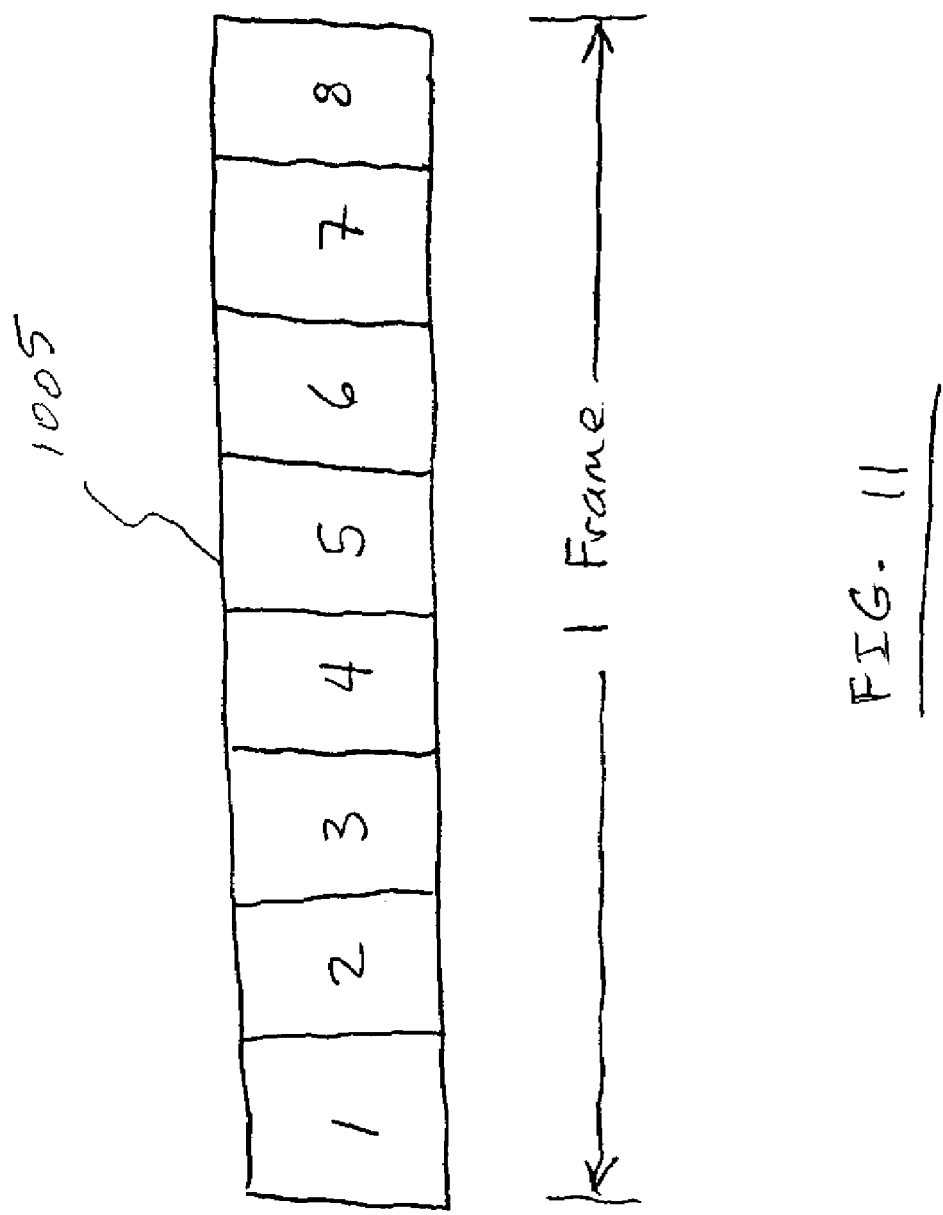
FIG. 11 illustrates a Global System for Mobile Communication (GSM) data frame suitable for processing by exemplary embodiments according to the invention.

Referring more specifically to a GSM application, FIG. 11 shows a GSM data frame 1005. Frame 1005 includes 8 slots, which correspond to bursts of data. For example, for GSM speech, slot 1 represents a monitor slot, slot 3 is a receive slot, and slot 6 constitutes a transmit slot. The remaining slots constitute idle slots.

Figure 12:
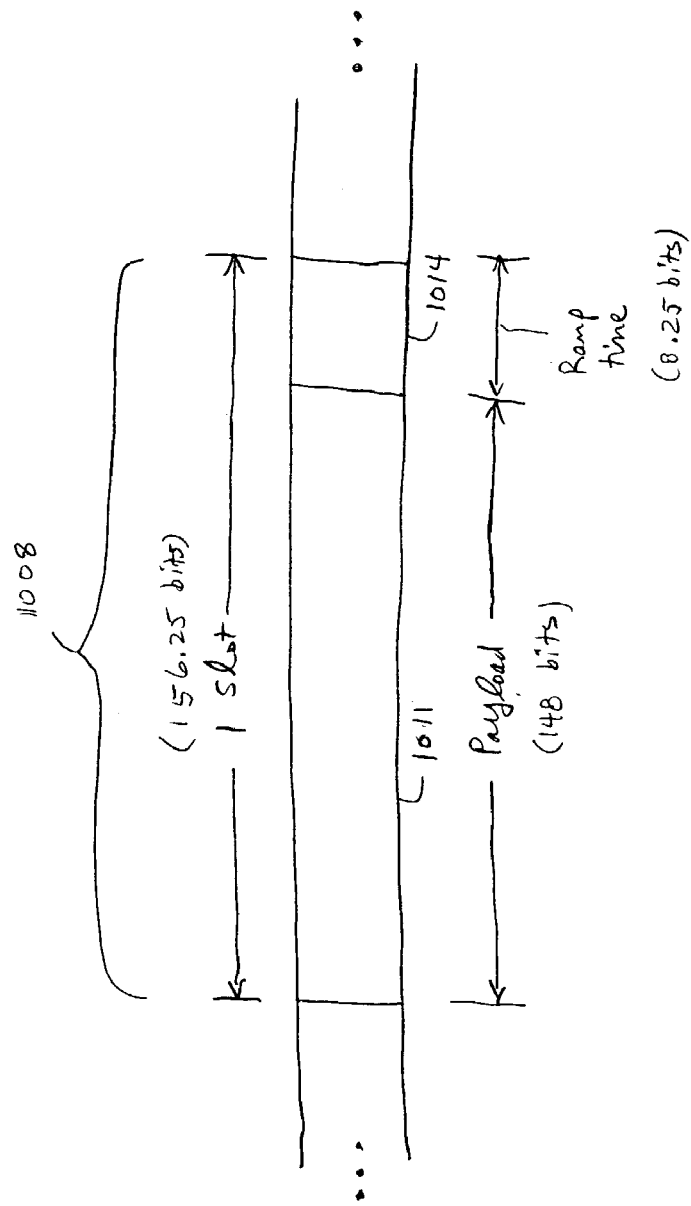
FIG. 12 depicts more details of a representative slot in the GSM data frame of FIG. 11.

FIG. 12 illustrates more details of a representative GSM slot. Slot 1008 represents 156.25 bits, with a bit rate of 270.833 kilo-bits per second, and a payload 1011 of 148 bits. A GSM radio uses the remaining 8.25 bits (156.25 bits −148 bits) to ramp a power amplifier (e.g., power amplifier 915 in FIG. 10) during ramp period 1014.

Figure 13:
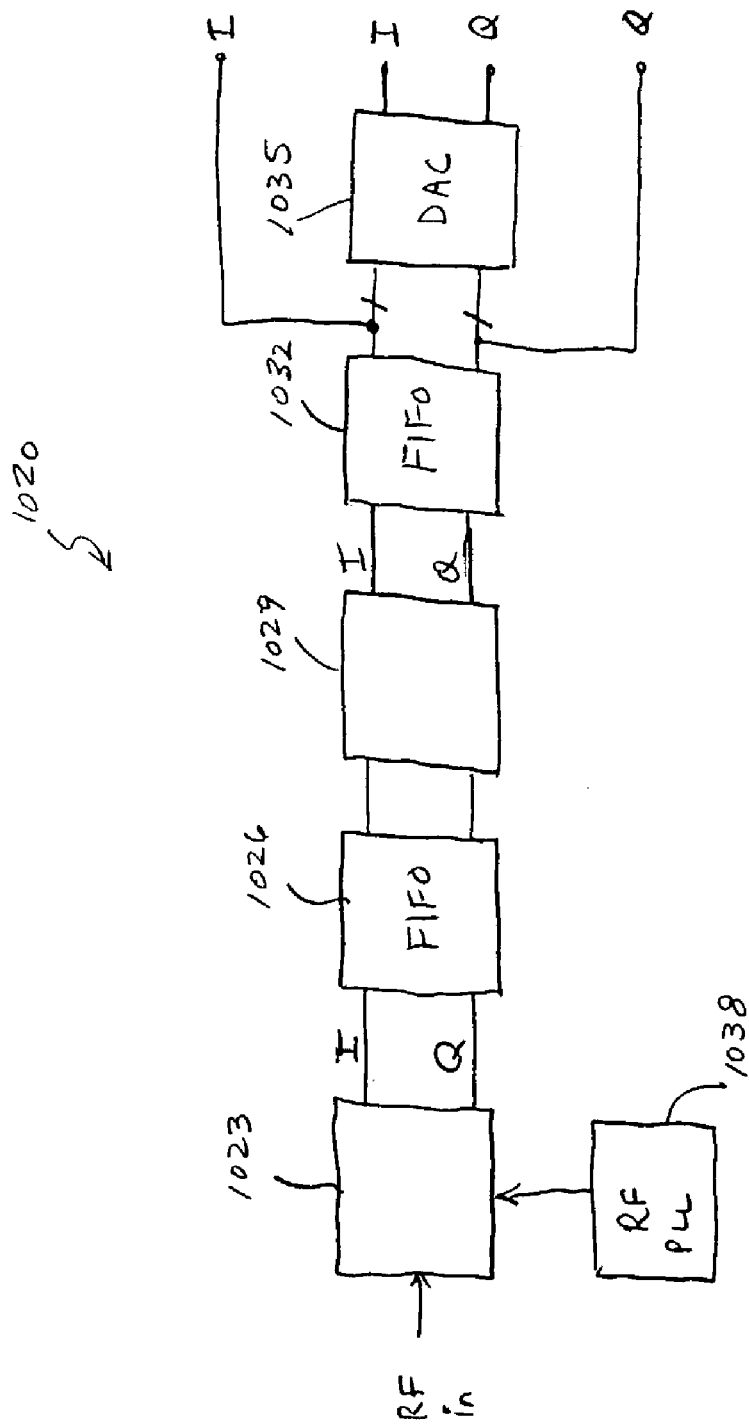
FIG. 13 shows an illustrative embodiment of a radio receiver according to the invention.

FIG. 13 depicts an illustrative embodiment of a radio receiver 1020 according to the invention. Radio receiver 1020 may constitute a GSM receiver or other type of receiver, as desired. One may use receiver 1020 either as a receiver or as part of transceiver, as desired.

Receiver 1020 includes receiver analog circuitry 1023, which accepts and processes RF in signals and provides in-phase (I) and quadrature (Q) digital signals to FIFO 1026. Receiver analog circuitry 1023 receives an RF signal from RF phase-lock loop (RF PLL) circuitry 1038, which it may use for the processing (such as mixing) of the input RF signals. The in-phase and quadrature outputs of FIFO 1026 couple to receiver digital circuitry 1029. Receiver digital circuitry may include functionality such as digital down-conversion and filtering.

Note that one may include some of the functionality of the receiver digital circuitry 1029 in receiver analog circuitry 1023, as desired. More specifically, one may include both analog and digital circuitry within receiver analog circuitry 1023. Some of the digital circuitry may provide part or all of the functionality of receiver digital circuitry 1029, as desired. One may employ interference management and mitigation techniques and circuitry, as described above, to reduce interference between the analog and digital circuitry, as desired. The in-phase and quadrature outputs of receiver digital circuitry 1029 (or in-phase and quadrature outputs of receiver analog circuitry 1023 if one includes the functionality of receiver digital circuitry 1029 within receiver analog circuitry 1023) feed FIFO 1032.

The in-phase and quadrature outputs of FIFO 1032 constitute the digital outputs of receiver 1020. The in-phase and quadrature outputs of FIFO 1032 may optionally couple to digital-to-analog converter (DAC) 1035. DAC 1035 generates analog in-phase and quadrature outputs of receiver 1020.

FIFO 1026 and FIFO 1032 function as storage devices to provide time domain isolation, as described above, and one may use circuitry other than FIFOs, as desired. Receiver analog circuitry 1023 and receiver digital circuitry 1029 may respectively constitute the Si4200 and Si4201 ICs produced by Silicon Laboratories Inc., the assignee of this patent application, as desired. Generally, receiver analog circuitry 1023 and receiver digital circuitry 1029 may constitute the respective circuitries described in U.S. patent application Ser. No. 10/075,122, titled "Digital Architecture for Radio-Frequency Apparatus and Associated Methods," or other suitable circuitry, as desired.

Receiver 1020 operates as follows. During RF reception, receiver analog circuitry 1023 loads FIFO 1026 with data. While FIFO 1026 loads, receiver digital circuitry 1029 is OFF, disabled, or inhibited. In the exemplary embodiment shown, FIFO 1026 has a capacity of about 4 kB (148×48× 2×2), although it may include some extra capacity for operations related to receiver digital circuitry 1029, as desired.

Once FIFO 1026 has loaded with data, during the ramp time (or during signal-processing time slots 110A-110B generally), receiver digital circuitry 1029 receives and processes data from FIFO 1026. Output data from receiver digital circuitry 1029 loads FIFO 1032. The operation occurs in 14,208 clock cycles (148×48×2 cycles). To process the data in FIFO 1026 during the ramp time (see FIG. 12), receiver 1020 clocks the digital circuits in receiver digital circuitry 1029 at a minimum clock rate of 466.42 MHz (26 MHz×148/8.25). Thus, the clock rate for receiver digital circuitry 1029 is a multiple of the clock rate for the ADC in receiver analog circuitry 1023.

Once FIFO 1032 begins to load, DAC 1035 (if used) can begin to output data to a baseband (not shown explicitly in FIG. 13) or signal-processing circuitry. Note that, depending on the specific baseband used, one may omit DAC 1035 and couple the baseband inputs to FIFO 1032. As persons of ordinary skill in the art who have the benefit of the description of the invention understand, the capacity of FIFO 1026 depends on a number of factors, such as the partitioning of signal processing functions between receiver analog circuitry 1023 and receiver digital circuitry 1029.

Figure 14:
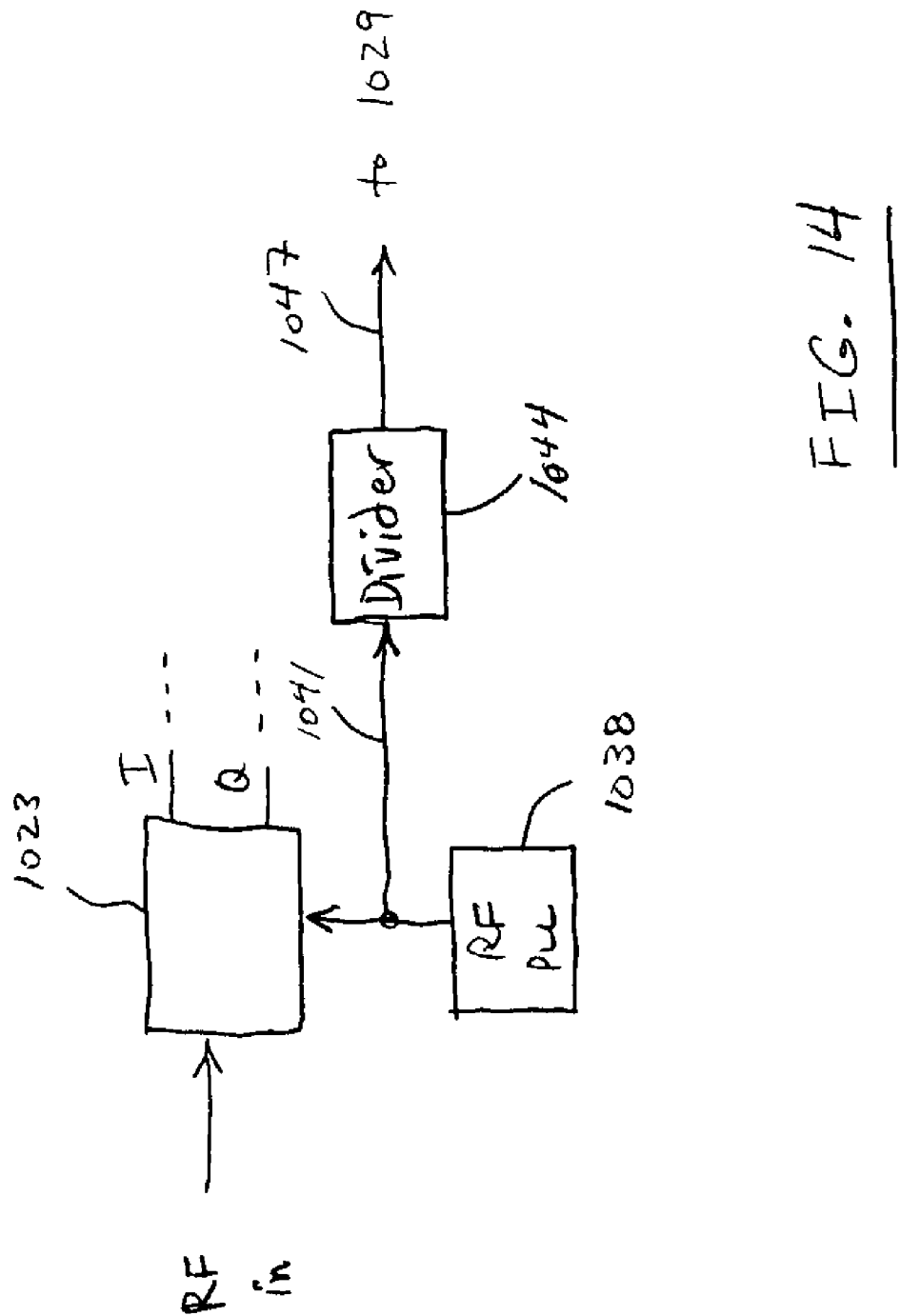
FIG. 14 illustrates a clock generation arrangement for use in the receiver of FIG. 13.

One may use RF PLL circuitry 1038 in conjunction with a divider to generate the clock signal for receiver digital circuitry 1029. FIG. 14 shows such a clock generation arrangement. RF PLL 1038 generates an output signal 1041, which it supplies to receiver analog circuitry 1023 and to divider 1044. Divider 1044 generates a clock signal 1047 whose frequency is a fraction of the frequency of RF PLL output signal 1041. Divider 1044 provides clock signal 1047 to receiver digital circuitry 1029. Clock signal 1047 feeds the digital circuits within receiver digital circuitry 1029. Note that, depending on the frequencies used, one may use a second divider (not shown explicitly) to generate RF LO signals for use in receiver analog circuitry 1023, as desired.

Rather than using the arrangement shown in FIG. 14, one may use other circuit arrangements for clock generation, as persons of ordinary skill in the art who have the benefit of the description of the invention understand. For example, one may use a crystal oscillator (with or without divider(s)), or a PLL (with or without divider(s)) for generating clock signals, etc.

Using the arrangement shown in FIG. 14 may provide several benefits. First, it eliminates a need for an extra clock signal generator. Second, one may use a divider within a VCO (not shown explicitly) in RF PLL 1038 to generate clock signal 1047, as desired. Third, one may flexibly select a frequency that is not within the receive band of receiver 1020 in order to avoid spurs and undesirable interference.

Figure 15:
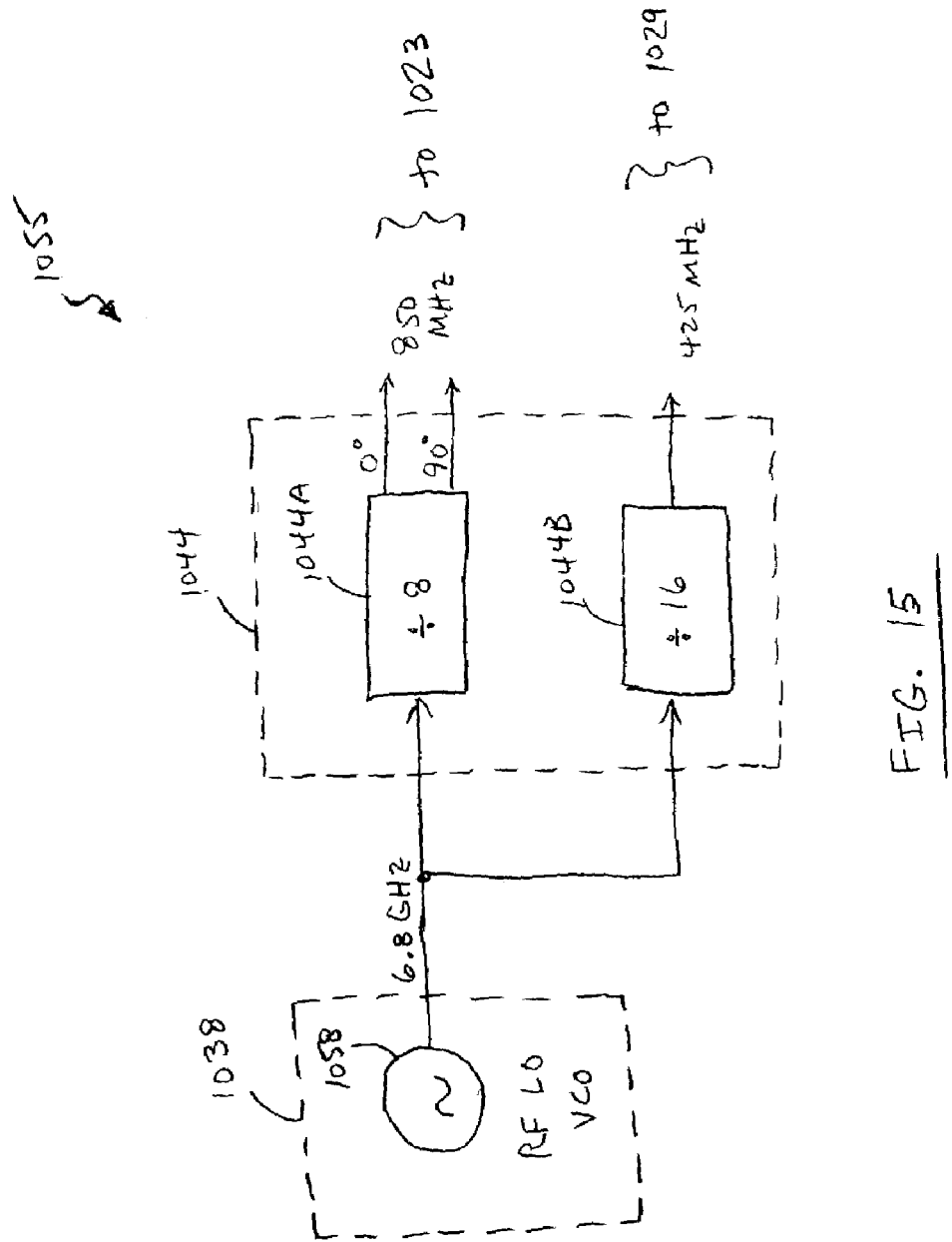
FIG. 15 depicts a circuit arrangement for generating signals for use in a GSM 850 band radio according to the invention.

FIG. 15 shows an exemplary embodiment 1055 of an arrangement for generating signals appropriate for use in a GSM 850 band radio according to the invention (such as receiver 1020). RF LO VCO 1058 within RF PLL 1038 generates a 6.8 GHz signal that it provides to divider 1044. Divider 1044 includes divider 1044A and divider 1044B. Divider 1044A divides the 6.8 GHz signal by 8 to generate in-phase and quadrature 850 MHz signals that it provides to receiver analog circuitry 1023 (for use, for instance, in mixing the input RF signals). Divider 1044B divides the 6.8 GHz signal by 16 to generate a 425 MHz signal that it provides to receiver digital circuitry 1029. Receiver digital circuitry 1029 uses the 425 MHz signal as a clock signal, as noted above.

Rather than using the division factors shown in FIG. 15 (i.e., 8 and 16), one may use a variety of other division factors, as desired, and as persons skilled in the art with the benefit of the description of the invention understand. Thus, through the choice of a suitable division factor, divider 1044B may generate a clock frequency that is above or below the receive band of receiver 1020, as desired.

Furthermore, one may use a separate PLL and corresponding VCO (not shown explicitly in FIG. 15) to provide clock signals to receiver digital circuitry 1029, as desired. Such a PLL/VCO need not have as stringent performance requirements as RF PLL 1038. For example, such a PLL may have relatively relaxed phase noise specifications, which may result in lower power consumption. As another alternative, one may use other sources of clock frequency for receiver digital circuitry 1029, for example, a crystal oscillator, as desired. The PLL or other source of clock frequency supplies clock signals to receiver digital circuitry 1029 during signal-processing time slots 110A-110B.

Note that digital signal processing may occur (e.g., within receiver digital circuitry 1029) during the calibration or settling period of RF PLL 1038. Furthermore, note that one may apply the arrangement shown in FIG. 15 to other bands by making modifications that fall within the knowledge of persons skilled in the art who have the benefit of the description of the invention.

Figure 16:
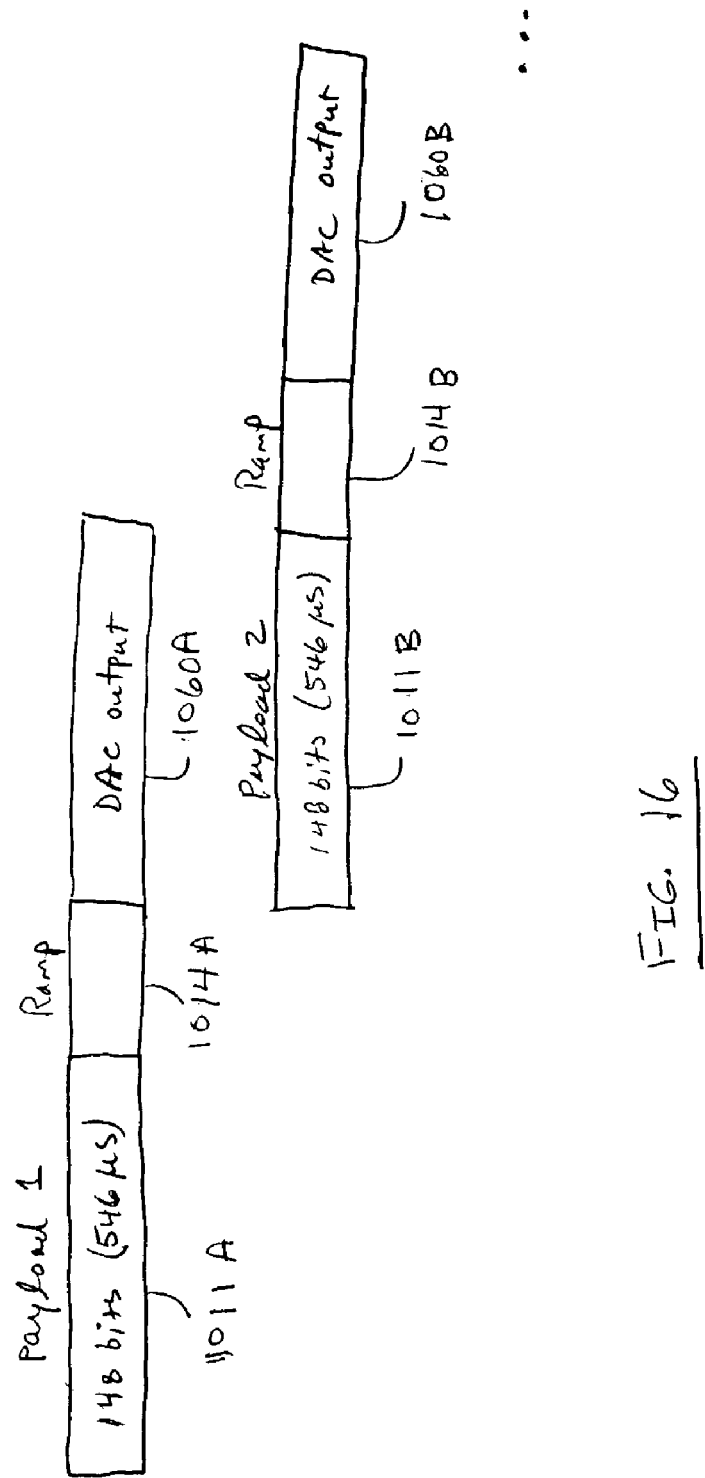
FIG. 16 shows a set of events that take place during reception in the exemplary receiver of FIG. 13.

FIG. 16 illustrates a set of events that take place during reception in the exemplary receiver 1020 (see FIG. 13) according to the invention. Receiver 1020 provides payload 1011A, followed by ramp time 1014A. During ramp time 1014A, receiver digital circuitry 1029 operates on data corresponding to payload 1011A. As a result, receiver 1020 provides DAC output data 1060A (if receiver 1020 uses DAC circuitry) to the baseband or signal-processing circuitry (not shown explicitly).

Note that DAC (if used) output data 1060A has a delay of one slot. Furthermore, during the provision of DAC output data 1060A, receiver 1020 also provides payload 1011B. Ramp time 1014B follows payload 1011B. During ramp time 1014B, receiver digital circuitry 1029 operates on data corresponding to payload 1011B. Consequently, receiver 1020 provides DAC output data 1060B (if receiver 1020 uses DAC circuitry) to the baseband or signal-processing circuitry (not shown explicitly), and so on.

Note that, to eliminate or reduce interference, receiver 1020 avoids running receiver digital circuitry 1029 during reception of RF signals by receiver analog circuitry 1023. One may apply this time-domain isolation concept to not only reception, but also transmission, and audio functions (speaker and microphone). As a result, one may include signal-processing circuitry (baseband and digital circuitry) together with the front-end RF circuitry in the same partition or IC.

Figure 17:
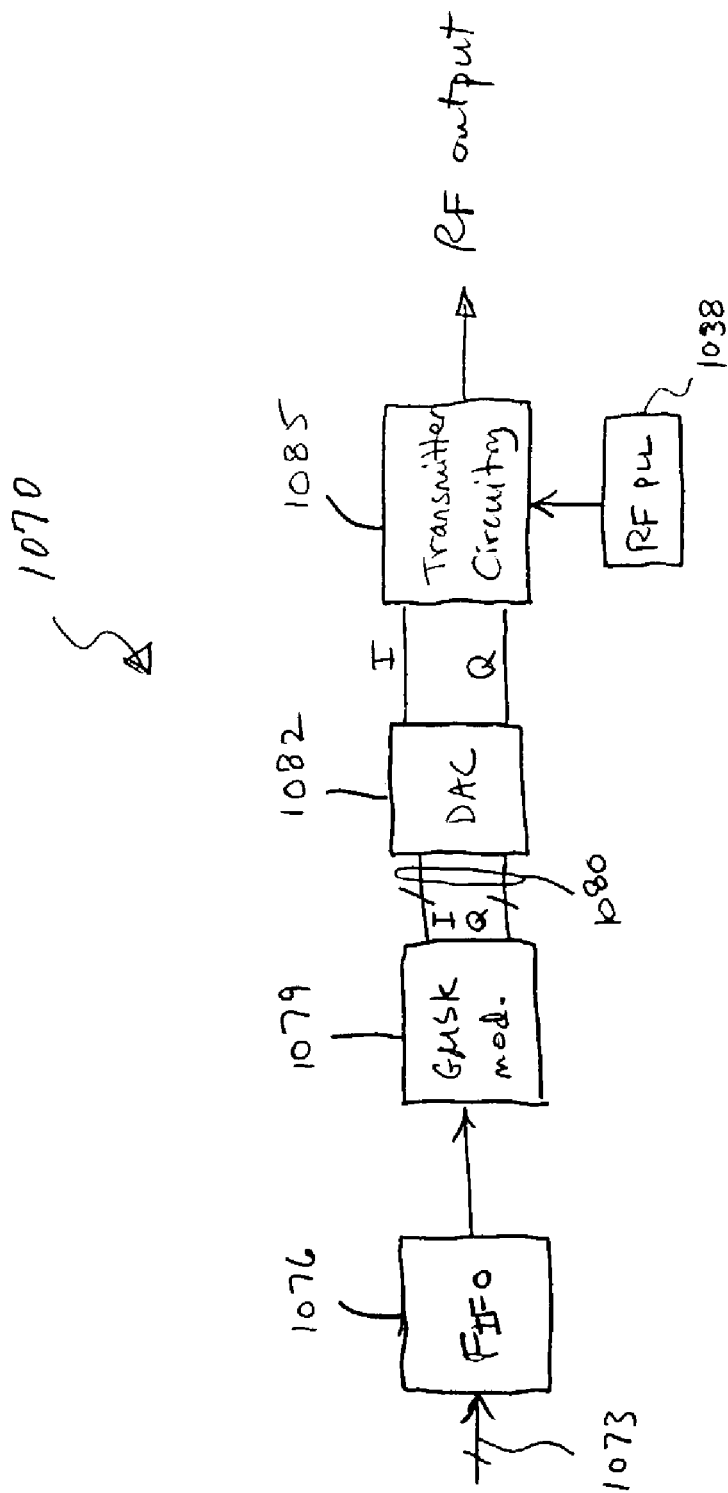
FIG. 17 illustrates a block diagram of an exemplary embodiment according to the invention of a GSM transmitter.

FIG. 17 shows a block diagram of an exemplary embodiment according to the invention of a GSM transmitter 1070. One may use transmitter 1070 either as a transmitter or as part of a transceiver, as desired. Transmitter 1070 includes FIFO 1076, which receives information bits intended for modulation and transmission. For GSM operation, FIFO 1076 stores 148 bits of data. Gaussian minimum phase shift keying (GMSK) modulator 1079 receives data from FIFO 1076, modulates the data, and provides in-phase and quadrature modulated data 1080 to DAC 1082.

DAC 1082 converts modulated data 1080 to analog signals, and provides the resulting analog in-phase and quadrature signals to transmitter circuitry 1085. Using an RF signal from RF PLL 1038, transmitter circuitry 1085 generates RF output signals suitable for transmission (e.g., by using a buffer, power amplifier, and antenna and related circuitry).

Generally, transmitter circuitry 1085 may constitute the transmitter circuitry disclosed in U.S. patent application Ser. No. 10/075,122, titled "Digital Architecture for Radio-Frequency Apparatus and Associated Methods," or other suitable transmitter circuitry, as desired. Because of the time-division duplex nature of GSM, DAC 1082 may constitute the same DAC as DAC 1035 (if used in receiver 1020) in FIG. 13, together with appropriate control circuitry, as persons skilled in the art with the benefit of the description of the invention understand.

Note that one may interchange the locations of FIFO 1076 and GMSK modulator 1079, as desired. In such an arrangement, GMSK modulator 1079 receives and modulates the input data and provides the modulated signals to FIFO 1076.

Figure 18:
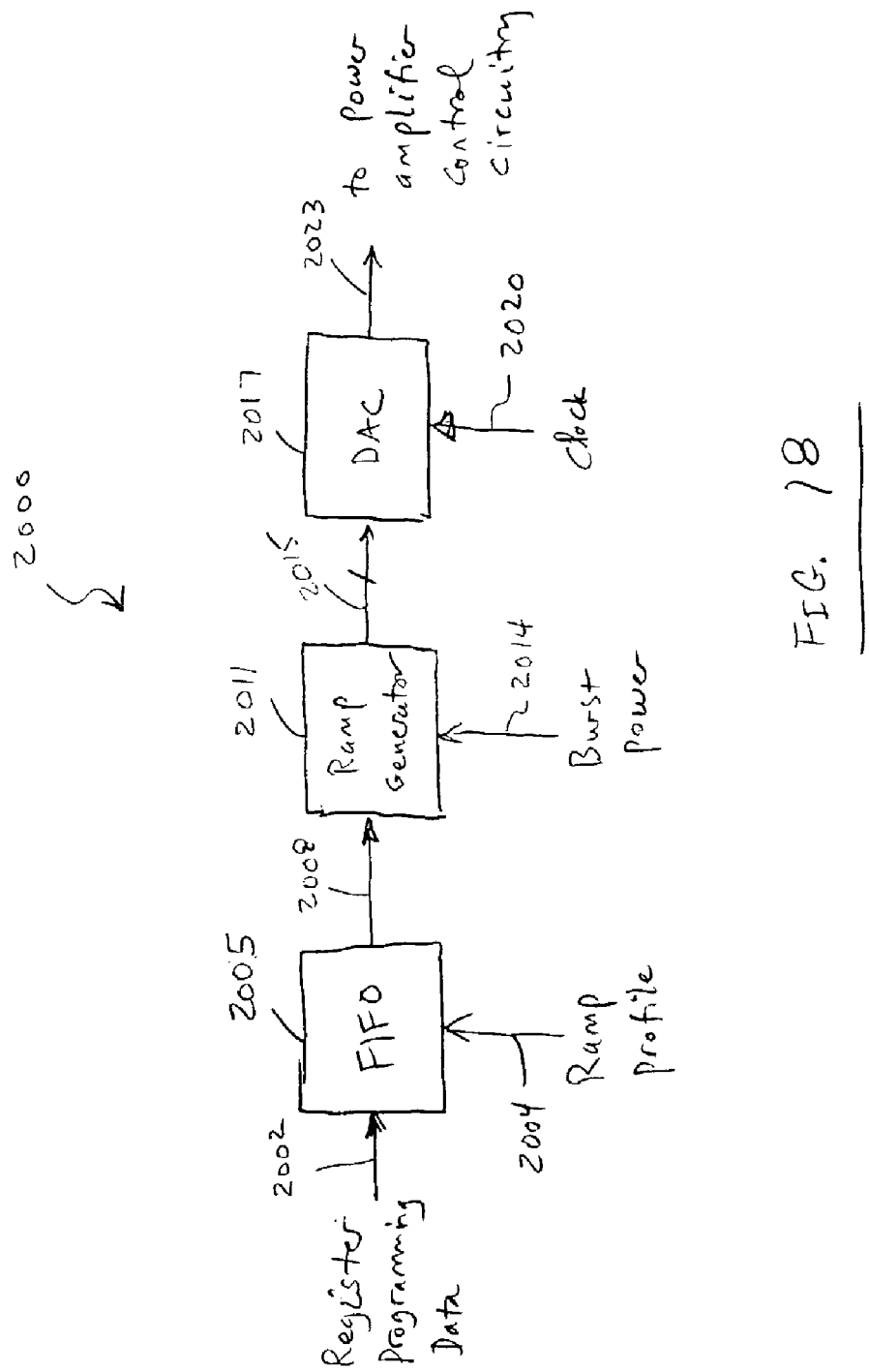
FIG. 18 depicts a block diagram of an exemplary embodiment of a power amplifier (PA) ramp control circuitry according to the invention.

As noted above, the RF output of transmitter circuitry 1085 may couple to a power amplifier. FIG. 18 depicts a block diagram of an exemplary embodiment of a power amplifier (PA) ramp control circuitry 2000 according to the invention. PA ramp control circuitry 2000 programs the ramp profile of the PA based on information it receives from the baseband or signal-processing circuitry (not shown explicitly). One may program the ramp profile for each band of transmission, as desired, and as persons of ordinary skill in the art with the benefit of the disclosure of the invention understand.

PA ramp control circuitry 2000 includes FIFO 2005. FIFO 2005 receives and stores register programming data 2002 and ramp profile 2004 from the baseband or signal-processing circuitry. Output 2008 of FIFO 2005 drives ramp generator 2011. Ramp generator 2011 receives output 2008 and burst power signal 2014. Burst power signal 2014 prescribes the transmission power level of each burst. Using output signal 2008 and burst power signal 2014, ramp generator 2011 generates ramp data 2015, which it provides to DAC 2017. In response to clock signal 2020, DAC 2017 converts ramp data 2015 to ramp control signal 2023. Note that the digital circuitry used for signal-processing (baseband or signal-processing circuitry) is OFF, disabled, or inhibited during transmission. PA ramp control circuitry 2000 provides ramp control signal 2023 to the PA (not shown explicitly).

Figure 19:
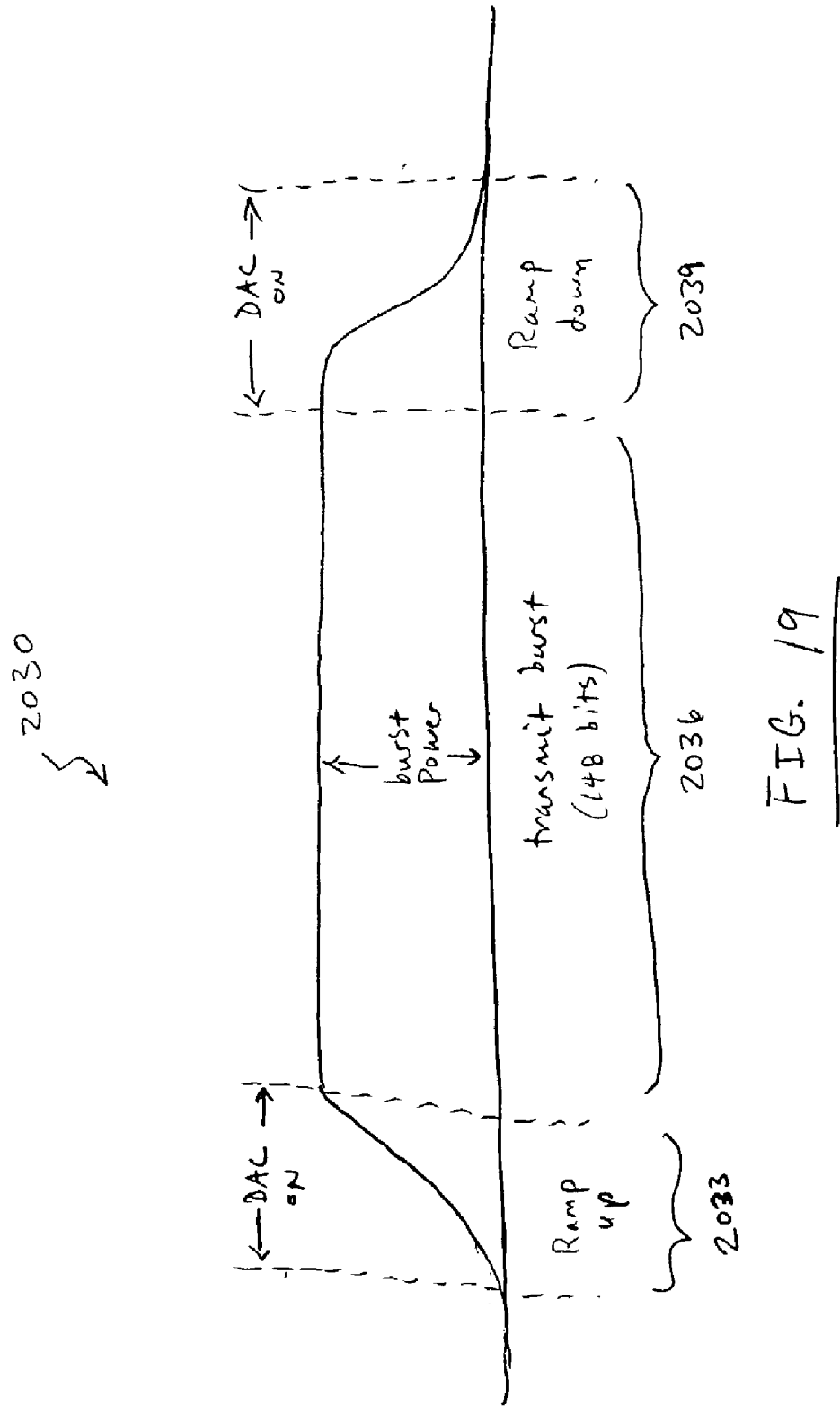
FIG. 19 shows a PA ramp profile in an exemplary embodiment of an RF apparatus according to the invention.

FIG. 19 illustrates a PA ramp profile 2030 in an exemplary embodiment of an RF apparatus according to the invention. Ramp profile 2030 includes a ramp-up period 2033, during which DAC 2017 (see FIG. 18) is ON or enabled. During this period, the PA output power ramps up to the prescribed burst power. During transmit period 2036, DAC 2017 is ON or enabled, and the PA outputs a signal with the prescribed burst power to provide a transmit burst of 148 bits. During ramp-down period 2039, DAC 2017 (see FIG. 18) is ON or enabled, and the PA output power ramps down.

In a transceiver application, one generally includes transducers for accepting and providing audio. Typically, the transducers take the form of a microphone (for accepting audio) and a speaker (for providing audio to a user). As noted above, one may apply time-domain isolation concepts to the speaker and microphone, as desired. The audio signals may generally constitute a variety of signals, such as speech (with a bandwidth of for example 4 kHz), music, hi-fi audio (with a bandwidth of for example 20 kHz), and the like.

Figure 20:
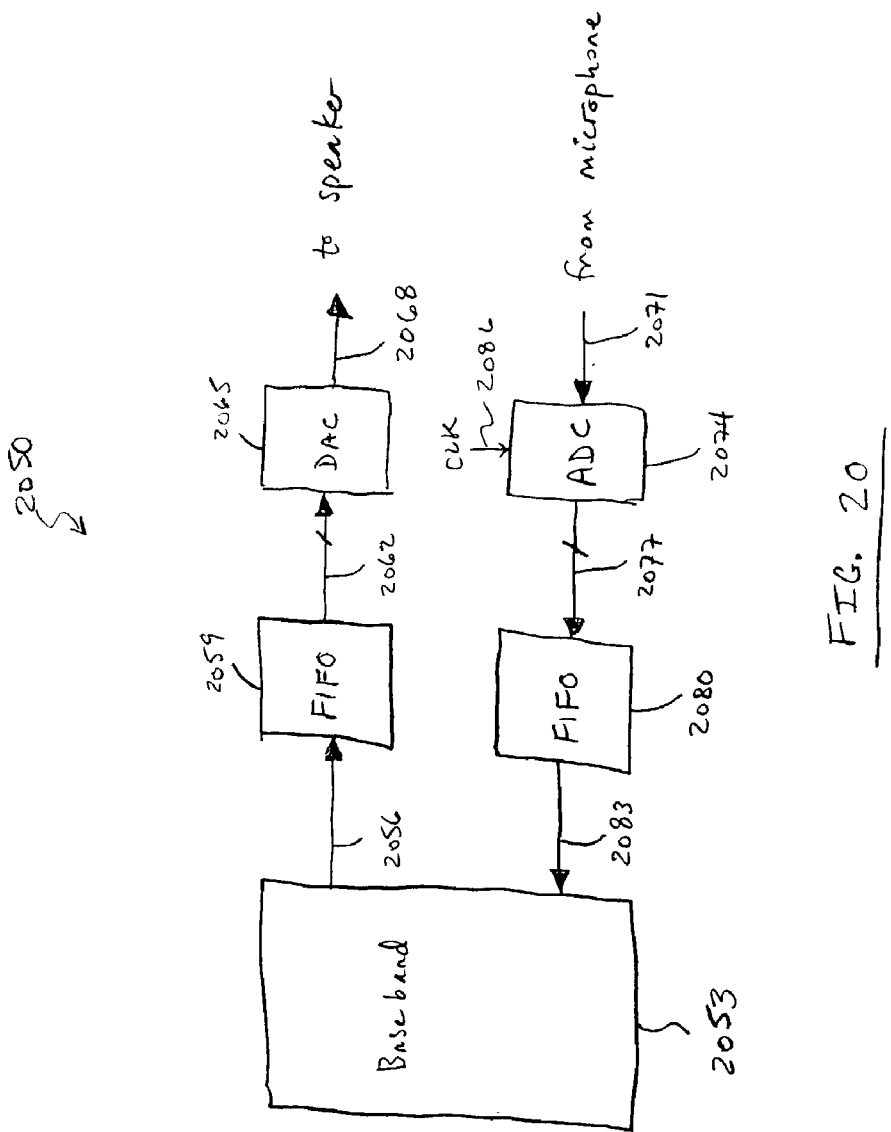
FIG. 20 illustrates a circuit arrangement for interfacing with a speaker and a microphone in an exemplary embodiment according to the invention.

FIG. 20 shows a circuit arrangement 2050 for interfacing with a speaker and a microphone in an exemplary embodiment according to the invention. Circuit arrangement 2050 includes baseband 2053, which may include the functionality of signal-processing circuitry 215 (as described above), as desired. One may power down (turn OFF), disable, or inhibit, or inactivate baseband 2053 during transmission or reception, as described in detail in this application.

To interface to a speaker (not shown explicitly), baseband 2053 provides digital signal 2056 to FIFO 2059. Digital signal 2056 may include general audio information, such as speech, music, hi-fi audio, etc. FIFO 2059 provides buffered digital data 2062 (audio samples) to DAC 2065. DAC 2065 converts buffered digital data 2062 into analog signal 2068, which drives the speaker. DAC 2065 runs continuously to provide analog signal 2068 to the speaker.

To interface to a microphone (not shown explicitly), ADC 2074 accepts analog signal 2071 from the microphone and converts analog signal 2071 into digital signal 2077. ADC 2074 uses clock signal 2086 (for example, a 13 MHz clock signal) to perform the conversion. ADC 2074 runs continuously to accept analog signal 2071 from the microphone. FIFO 2080 accepts digital signal 2077 (sampled audio) from ADC 2074, and provides buffered digital signal 2083 to baseband 2053 for further processing.

The capacity of FIFO 2059 depends on a number of factors, as persons of ordinary skill in the art who have the benefit of the description of the invention understand. Such factors include the type of data (audio calls, MP3 sound or music data, etc.), the number of bursts for which one stores the data, whether the data constitutes oversampled data, and the like.

For example, in one embodiment according to the invention, FIFO 2059 and FIFO 2080 may have a capacity of for example 14,208 bits (148×48×2), or about 2 kB. For storing audio samples (with a frequency of 4 kHz), FIFO 2059 and FIFO 2080 may have a capacity of 70 bits (corresponding to 4 samples). Note that FIFO 2059 and FIFO 2080 may have other capacities, as desired, depending on factors such as the bandwidths of the audio signals in a particular application, etc. Furthermore, note that, rather than using digital FIFOs, one may use analog FIFOs, such as FIFOs implemented with sample-and-hold circuitry, as desired.

FIG. 21 shows a more detailed block diagram of an exemplary embodiment of a mobile telephone 2100 according to the invention. Telephone 2100 may constitute a telephone configured to operate according to GSM specifications, as desired. Telephone 2100 uses circuit partition 2103, which includes RF transceiver circuitry.

More specifically, the receive-path circuitry of telephone 2100 receives RF signals via antenna 935 and front-end interface 910. The remainder of the receive-path circuitry may be similar to that of receiver 1020 (see FIG. 13) or other suitable receive-path circuitry, as desired, and as persons skilled in the art with the benefit of the description of the invention understand. In the embodiment shown, it includes receiver analog circuitry 1023 (which includes RF receive circuitry 1023A and ADC 1023B), FIFO 1026, and receiver digital circuitry 1029. RF receive circuitry 1023A may include LNAs, mixers, etc., as persons of ordinary skill in the art who have the benefit of the description of the invention understand.

Receiver digital circuitry 1029 provides digital in-phase and quadrature signals to baseband 2053 for further processing and demodulation. Baseband 2053 may include digital signal processor(s), microcontroller(s), associated discrete logic, and memory (e.g., RAM, ROM), as desired. Note that one may combine the functionality, circuitry, or both, of receiver digital circuitry 1029 and baseband 2053, as desired.

Note that one may use alternative arrangements for the receive-path circuitry, as desired. For example, one may use an arrangement where receiver digital circuitry 1029 follows ADC 1023B, and FIFO 1026 follows receiver digital circuitry 1029. As another example, one may use an arrangement where part of receiver digital circuitry 1029 (active or operational during a receive burst) follows ADC 1023B, followed by FIFO 1026, and followed by the remainder of receiver digital circuitry 1029 (which may reside in baseband 2053, as desired). Furthermore, one may use a variety of alternative arrangements, as persons of ordinary skill in the art who have the benefit of the description of the invention understand.

The transmit-path circuitry may be similar to transmitter 1070 (see FIG. 17) or other suitable transmit-path circuitry, as desired, and as persons skilled in the art with the benefit of the description of the invention understand. In the embodiment shown, it includes GMSK modulator 1079, FIFO 1076, DAC 1082, and transmitter circuitry 1085. As noted above, one may reverse the order of GMSK modulator 1079 and FIFO 1076, as desired. Note that one may include a FIFO (not shown explicitly in FIG. 21) before GMSK modulator 1079 to store the raw transmit data, as desired.

Transmitter circuitry 1085 couples to power amplifier 915 and provides modulated RF signals to power amplifier 915 via signal link 925. In conjunction with PA ramp control circuitry 2000, power amplifier 915 provides amplified RF signals to front-end interface 910 via signal link 930. Front-end interface 910 provides the amplified RF signals to antenna 935 for transmission into a medium.

Telephone 2100 includes a real-time clock (RTC) 2115. Using a crystal 2112, which may have a frequency of for example 32 kHz, real-time clock 2115 provides clock, alarm clock, calendar, and other similar functionality, as desired. Crystal 2118, digitally controlled crystal oscillator (DCXO) 2121, and RF PLL 1038 operate to provide receive and transmit LO signals and digital clock signals (e.g., clock signals for receiver digital circuitry 1029, baseband 2053, and other circuitry within telephone 2100). RF PLL 1038 may couple to divider circuitry (not shown explicitly in FIG. 21), as FIGS. 14 and 15 illustrate, as desired. As noted above, one may provide the digital clock signals using a variety of arrangements and signal sources (e.g., separate PLL), as desired.

Through USB interface circuitry (not shown explicitly), telephone 2100 may couple to, and interface with, USB device 2124, as desired. Telephone 2100 may couple to, and interface with, other devices, as desired, and as persons of ordinary skill in the art who have the benefit of the description of the invention understand. Such devices include UART, and serial interfaces or ports. Telephone 2100 may include one or more interfaces for such devices, as desired. Furthermore, one may include within telephone 2100 one or more FIFOs to facilitate interfacing with such devices.

SIM card 2127 couples to telephone 2100. SIM card 2127 may include various information and data about telephone 2100 and the subscriber, as persons skilled in the art understand. Keypad 2130 allows the user to enter symbols, such as alphanumeric symbols. Display 2133 provides text, image, graphic, and similar information to the user.

Battery 2136 provides power to telephone 2100. Battery 2136 couples to, and provides un-regulated battery power to, regulator 2139. Regulator 2139 regulates the battery voltage, current, and/or power and powers various blocks of telephone 2100, as desired. More specifically, regulator 2139 may provide multiple outputs that have different properties (e.g., voltage level) to supply regulated power to various parts of telephone 2100.

Telephone 2100 provides and accepts audio signals via speaker 2151 and microphone 2154, respectively. Speaker 2151 and microphone 2154 couple to voice CODEC 2142, which decodes and codes the out-bound and in-bound audio information, respectively. CODEC 2142 couples to FIFO 2059 and FIFO 2080. FIFO 2059 receives audio digital signal 2056 from baseband 2053, and provides buffered digital data 2062 to CODEC 2142. FIFO 2080 receives coded audio signals from CODEC 2142, and provides buffered digital signal 2083 to baseband 2053.

Telephone 2100 also includes schedule controller 2148. Schedule controller 2148 controls the occurrence and timing of various events within telephone 2100 (for example, to implement time-domain isolation). Schedule controller 2148 accomplishes that task by using power signals 2160 and control signals 2163, which it provides to various blocks of telephone 2100. Power signals 2160 cause various blocks of telephone 2100 to power up and power down, as desired. Control signals 2163 determine the timing of various events within telephone 2100 by controlling the relevant blocks within telephone 2100.

The disclosed inventive concepts provide a flexible framework for a variety of communication apparatus architectures and configurations. Examples of illustrative applications include:

low-IF receiver circuitry;
low-IF receiver circuitry and offset-phase-locked loop (PLL) transmitter circuitry;
low-IF receiver circuitry and direct up-conversion transmitter circuitry;
direct-conversion receiver circuitry;
direct-conversion receiver circuitry and offset-PLL transmitter circuitry; or
direct-conversion receiver circuitry and direct up-conversion transmitter circuitry.

Note that the above examples provide only a few possible architectures for communication apparatus according to the invention. One may use a wide array of combinations of receiver circuitry, transmitter circuitry, or transceiver circuitry, as persons of ordinary skill in the art who have the benefit of the description of the invention understand.

Using the techniques and apparatus according to the invention, one may implement highly integrated communication apparatus for use in a wide variety of applications, as persons skilled in the art with the benefit of the description of the invention understand. Some applications include mobile and cellular handsets, machine-to-machine (M2M) communication networks (e.g., wireless communications for vending machines), so-called "911 phones" (a mobile handset configured for calling the 911 emergency response service), wireless networks, such as wireless local-area networks (LANs), and wide-area networks (WANs), emerging wireless applications, such as 3G, satellite communications, and the like.

Furthermore, one may use a variety of circuit and process technologies and materials to implement communication apparatus according to the invention. Examples of such technologies include metal oxide semiconductor (MOS), p-type MOS (PMOS), n-type MOS (NMOS), complementary MOS (CMOS), silicon-germanium (SiGe), gallium-arsenide (GaAs), silicon-on-insulator (SOI), bipolar junction transistors (BJTs), a combination of BJTs and CMOS (BiC-MOS), etc. The choice of the technology, circuitry, and materials depends on such factors as design and performance goals and specifications, cost, targeted market segments, and the like, as persons of ordinary skill in the art who have the benefit of the description of the invention understand.

Referring to the figures, note that the various blocks shown depict mainly the conceptual functions and signal flow. The actual circuit implementation may or may not contain separately identifiable hardware for the various functional blocks. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation, as persons of ordinary skill in the art who have the benefit of the description of the invention understand.

Other modifications and alternative embodiments of the invention in addition to those described here will be apparent to persons of ordinary skill in the art who have the benefit of the description of the invention. Accordingly, this description teaches those skilled in the art the manner of carrying out the invention and are to be construed as illustrative only. The forms of the invention shown and described should be taken as the presently preferred embodiments. Persons skilled in the art may make various changes in the shape, size and arrangement of parts without departing from the scope of the invention described in this document. For example, persons skilled in the art may substitute equivalent elements for the elements illustrated and described here. Moreover, persons skilled in the art who have the benefit of this description of the invention may use certain features of the invention independently of the use of other features, without departing from the scope of the invention.

We claim:

1. A method of communicating radio-frequency (RF) signals in a time-division-multiplexed (TDM) communications system using radio-frequency (RF) and signal-processing circuitry in a mobile telephone apparatus, the method comprising:

operating the radio-frequency circuitry during a first time period that is a TDM receive slot to generate a set of data that digitally represents in-phase signals and quadrature signals from a radio-frequency signal received by the mobile telephone apparatus;

during the first time period, restricting operations performed by the signal processing circuitry on the set of data;

storing the set of data in a storage device;

operating the signal-processing circuitry during a second time period to process the set of data, the second time period being one of a TDM idle slot and a period during which ramp bits are received; and storing the processed data for use by the mobile telephone apparatus.

2. A method of operating a radio-frequency (RF) circuitry and a signal-processing circuitry in a mobile telephone apparatus, the method comprising:

operating the signal-processing circuitry during a first time period to generate a set of data, the first time period being one of a TDM idle slot and a period during which ramp bits are received;

storing the set of data in a storage device;

operating the radio-frequency circuitry in a second time period that is a TDM transmit slot to generate radio-frequency signals from the set of data;

during the second time period restricting operations performed by the signal processing circuitry; and transmitting the radio-frequency signals as output signals of the mobile telephone apparatus.

3. The method of claim 1, wherein the step of restricting operations includes removing, from the processor, one of a power signal and a clock signal, and wherein the step of storing the processed data for use by the mobile telephone apparatus includes conveying in formation to a user of a mobile telephone apparatus.

4. The method of claim 1, wherein the stored the processed data is audio data for use in producing sound by a speaker in the mobile telephone apparatus.

5. The method of claim 2, wherein the step of restricting operations includes removing, from the processor, one of a power signal and a clock signal.

6. The method of claim 2, wherein the stored set of data is a digital version of an audio signal received from a microphone in the mobile telephone apparatus.

7. A method of communicating radio-frequency (RF) signals in a time-division-multiplexed (TDM) communications system by operating radio-frequency (RF) and signal-processing circuitry in a mobile telephone apparatus, the method comprising:

operating the radio-frequency circuitry during a TDM receive slots to generate a set of data that digitally represents in-phase signals and digital signals from a radio-frequency signal received by the mobile telephone apparatus;

during the TDM receive slots, restricting operations performed by the signal processing circuitry on the set of data;

storing the set of data in a storage device;

during time periods, operating the signal-processing circuitry to process the set of data, the time periods defined as a TDM idle slot and a period during which ramp bits are received;

storing the processed data for use by the mobile telephone apparatus;

operating the signal-processing circuitry during the time periods to generate transmission data;

storing the transmission data in the storage device;

during a TDM transmit slot, operating the radio-frequency circuitry to generate radio-frequency signals from the transmission data and conveying information between a user of the mobile telephone apparatus and the communications system.

* * * * *